United States Patent
Shiiba et al.

(10) Patent No.: US 10,253,197 B2
(45) Date of Patent: Apr. 9, 2019

(54) AQUEOUS INK, INK CARTRIDGE AND INK JET RECORDING METHOD

(71) Applicant: CANON KABUSHIKI KAISHA, Tokyo (JP)

(72) Inventors: Kenichi Shiiba, Warabi (JP); Kenji Moribe, Fujisawa (JP); Daiji Okamura, Tokyo (JP); Kousuke Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/910,097

(22) Filed: Mar. 2, 2018

(65) Prior Publication Data
US 2018/0258298 A1   Sep. 13, 2018

(30) Foreign Application Priority Data

Mar. 10, 2017   (JP) .................................. 2017-045708

(51) Int. Cl.
*B41J 2/21*    (2006.01)
*C09D 11/322*    (2014.01)
(Continued)

(52) U.S. Cl.
CPC ........... *C09D 11/322* (2013.01); *B41J 2/2107* (2013.01); *C08G 18/4825* (2013.01); *C08G 18/4833* (2013.01); *C08G 18/4854* (2013.01); *C08G 18/6692* (2013.01); *C08G 18/722* (2013.01); *C08G 18/73* (2013.01); *C08G 18/755* (2013.01); *C08G 18/758* (2013.01);
(Continued)

(58) Field of Classification Search
CPC .... C09D 11/322; C09D 11/102; B41J 2/2107; C08G 18/73; C08G 18/4854; C08G 18/6692; C08G 18/722; C08G 18/4825; C08G 18/755; C08G 33/04; C08G 18/4833; C08G 18/7671; C08G 18/758
See application file for complete search history.

(56) References Cited

U.S. PATENT DOCUMENTS 7,037,362 B2   5/2006 Honma et al.
7,141,107 B2   11/2006 Honma et al.
(Continued)

FOREIGN PATENT DOCUMENTS

EP   2 647 674 A1   10/2013
EP   2 662 423 A1   11/2013
(Continued)

OTHER PUBLICATIONS

May 30, 2018 extended European Search Report in European Patent Appln. No. 18160233.5.

*Primary Examiner* — Julian D Huffman
(74) *Attorney, Agent, or Firm* — Venable LLP

(57) ABSTRACT

To provide an aqueous ink for ink jet enabling the recording of an image having excellent character quality and excellent highlighter resistance immediately after the recording. An aqueous ink for ink jet includes a pigment and a urethane resin. The urethane resin has a unit derived from a polyisocyanate, a unit derived from a polyol having no acid group and a unit derived from a polyol having an acid group, the proportion of a unit derived from the polyol having an acid group present at the molecular terminal relative to the whole unit derived from the polyol having an acid group is 30% or less, and the aqueous ink has a dynamic surface tension of 55 mN/m or more at a lifetime of 10 msec.

10 Claims, 4 Drawing Sheets

(51) Int. Cl.

| | | |
|---|---|---|
| *C08G 18/48* | (2006.01) | |
| *C08G 18/66* | (2006.01) | |
| *C08G 18/72* | (2006.01) | |
| *C08G 18/73* | (2006.01) | |
| *C08G 18/75* | (2006.01) | |
| *C08G 18/76* | (2006.01) | |
| *C09D 11/102* | (2014.01) | |
| *C08L 33/04* | (2006.01) | |

(52) U.S. Cl.
CPC .......... *C08G 18/7671* (2013.01); *C08L 33/04* (2013.01); *C09D 11/102* (2013.01)

(56) References Cited

U.S. PATENT DOCUMENTS

| | | | |
|---|---|---|---|
| 7,176,248 B2 | 2/2007 | Valentini et al. | |
| 7,947,762 B2 | 5/2011 | Udagawa et al. | |
| 8,217,097 B2 | 7/2012 | Udagawa et al. | |
| 8,324,293 B2 | 12/2012 | Imai et al. | |
| 8,367,750 B2 | 2/2013 | Moribe et al. | |
| 8,684,509 B2 | 4/2014 | Yamasaki et al. | |
| 8,741,984 B2 | 6/2014 | Moribe et al. | |
| 9,169,413 B2 | 10/2015 | Shiiba et al. | |
| 9,452,608 B2 | 9/2016 | Okamura et al. | |
| 2003/0184629 A1 | 10/2003 | Valentini et al. | |
| 2004/0103815 A1 | 6/2004 | Honma et al. | |
| 2005/0178290 A1 | 8/2005 | Honma et al. | |
| 2007/0097156 A1 | 5/2007 | Udagawa et al. | |
| 2012/0154481 A1 | 6/2012 | Nishino et al. | |
| 2012/0249662 A1 | 10/2012 | Yamasaki et al. | |
| 2014/0307023 A1 | 10/2014 | Moribe et al. | |
| 2016/0222236 A1 | 8/2016 | Nakagawa et al. | |
| 2016/0222239 A1 | 8/2016 | Nakata et al. | |
| 2017/0335124 A1 | 11/2017 | Ayashi et al. | |
| 2017/0348967 A1 | 12/2017 | Okamura | |

FOREIGN PATENT DOCUMENTS

| | | |
|---|---|---|
| JP | 2003-231838 A | 8/2003 |
| JP | 2005-515289 A | 5/2005 |
| JP | 2005-200566 A | 7/2005 |
| JP | 2008-179657 A | 8/2008 |
| JP | 2012-214712 A | 11/2012 |
| WO | 2012/132305 A1 | 10/2012 |

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

Recent ink jet recording apparatuses enables the recording of images with higher image qualities at higher recording speeds, and are not only used to output photographic images and Web images for home use but also used in the business field more frequently. The ink for ink jet used to output business documents and the like is required to have high level reliability such as excellent ejection stability, and also to have performance capable of recording high quality images. Specifically, the ink is required to enable the recording of images with excellent character quality and also to enable the recording of images with excellent toughness such as highlighter resistance that an image is unlikely to be stained even when the image is traced by a highlighter.

Various proposals have been disclosed to meet these requirements. For example, it is disclosed that an ink having a higher dynamic surface tension at a short lifetime determined by a maximum bubble pressure method is used to suppress the permeation into or blurring on a recording medium to achieve excellent character quality (Japanese Patent Application Laid-Open No. 2003-231838 and Japanese Patent Application Laid-Open No. 2005-200566). It has also been studied that an ink containing a resin is used to form a tough pigment layer. In particular, it is disclosed that a pigment ink containing a urethane resin is used to improve the highlighter resistance of a recorded image (see Japanese Patent Application Laid-Open No. 2005-515289, Japanese Patent Application Laid-Open No. 2008-179657 and Japanese Patent Application Laid-Open No. 2012-214712).

SUMMARY OF THE INVENTION

The inventors of the present invention have studied an aqueous ink enabling the recording of images having excellent character quality and exhibiting high highlighter resistance even immediately after the recording. The study has shown that conventional aqueous inks are difficult to record images having such characteristics. This is because an image immediately after recording still contains a liquid component and thus the highlighter resistance immediately after recording is at a different level than that evaluated after a liquid component has been absorbed as a certain time has passed from image recording. The study has also shown that when the surface tension at a short lifetime determined by the maximum bubble pressure method is controlled to quickly remove a liquid component to improve the highlighter resistance of an image immediately after recording, the character quality of the recorded image is difficult to maintain at a high level.

The present invention is intended to provide an aqueous ink for ink jet enabling the recording of an image having excellent character quality and excellent highlighter resistance immediately after the recording. The present invention is also intended to provide an ink cartridge including the aqueous ink and an ink jet recording method.

The above objects are achieved by the following present invention. In other words, the present invention provides an aqueous ink for ink jet including a pigment and a urethane resin. In the aqueous ink for ink jet, the urethane resin has a unit derived from a polyisocyanate, a unit derived from a polyol having no acid group and a unit derived from a polyol having an acid group, a proportion of a unit derived from the polyol having an acid group present at a molecular terminal relative to the whole unit derived from the polyol having an acid group is 30% or less, and the aqueous ink has a dynamic surface tension of 55 mN/m or more at a lifetime of 10 msec.

According to the present invention, an aqueous ink for ink jet enabling the recording of an image having excellent character quality and excellent highlighter resistance immediately after the recording can be provided. According to the present invention, an ink cartridge including the aqueous ink and an ink jet recording method can also be provided.

Further features of the present invention will become apparent from the following description of exemplary embodiments with reference to the attached drawings.

DESCRIPTION OF THE EMBODIMENTS

Figure 1:
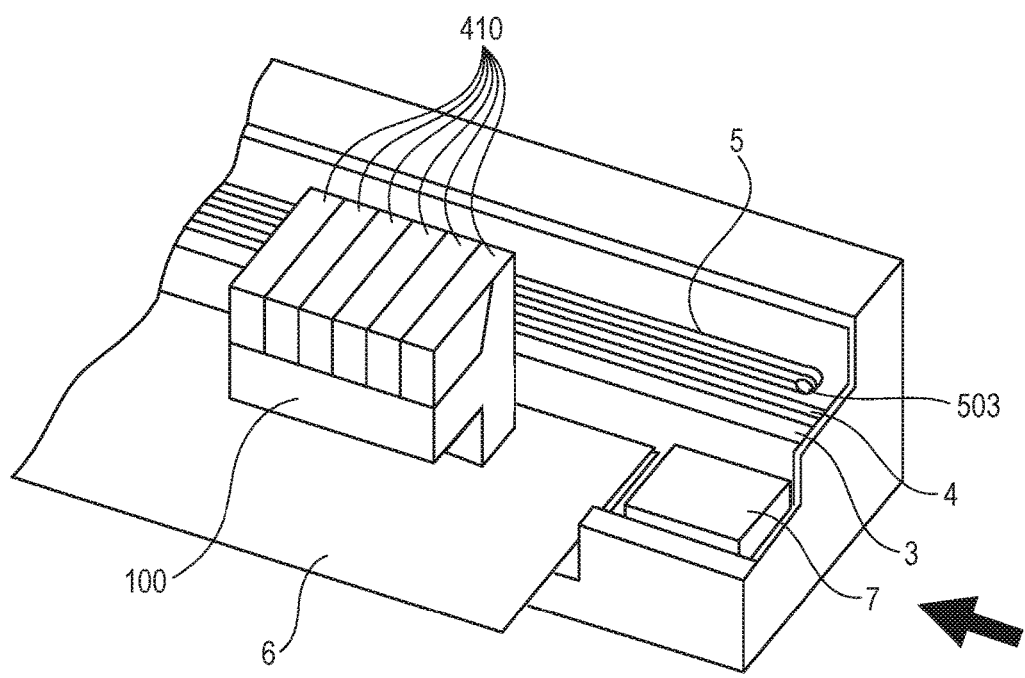
FIG. 1 is a perspective view schematically showing an example of a principal part of an ink jet recording apparatus.

Preferred embodiments of the present invention will now be described in detail in accordance with the accompanying drawings.

The present invention will now be described in detail with reference to preferred embodiments. In the present invention, when a compound is a salt, the salt dissociates into ions in an ink, but such a case is expressed as "containing a salt" for convenience. An aqueous ink for ink jet may be simply called "ink". Physical property values are values determined at normal temperature (25° C.) unless otherwise noted.

The inventors of the present invention have studied the constitution of an ink for ink jet enabling the recording of an image having excellent character quality and excellent highlighter resistance immediately after the recording. In order to record an image having excellent character quality, it is important to suppress the permeation of an ink into a recording medium and to efficiently allow a pigment to aggregate on the surface of a recording medium. For such a purpose, it is effective to increase the surface tension of an ink at a short lifetime determined by a maximum bubble pressure method. Meanwhile, in order to record an image having high highlighter resistance, it is important that an ink containing a resin is used to effectively bond the resin to the surface of a pigment layer or between pigment particles and the strength of the pigment layer is increased. For such a purpose, it is effective that an ink containing a urethane resin is used to more efficiently achieve highlighter resistance.

Next, the inventors of the present invention have studied an aqueous ink containing a urethane resin and having a higher dynamic surface tension at a short lifetime determined by the maximum bubble pressure method. The study has shown that by controlling the surface tension of an ink for an improvement of the character quality, the permeation of the urethane resin is suppressed, and thus an image after a certain time expresses sufficient highlighter resistance. The study, however, has shown that an image immediately after recording has insufficient highlighter resistance, and the image is easily stained when a physical force is applied to the image.

The inventors of the present invention have studied to clarify the cause of such a phenomenon. The study has shown that a pigment layer formed by application of the above ink has an insufficient strength immediately after recording. A liquid component in the ink having a high surface tension at a short lifetime determined by the maximum bubble pressure method slowly permeates into a recording medium. In addition, it is assumed that water evaporates insufficiently immediately after recording, thus the urethane resin in the pigment layer aggregates insufficiently, and the pigment layer having sufficient strength is not formed yet.

Next, the inventors of the present invention have studied the method of accelerating aggregation of the urethane resin. First, in order to facilitate the separation of a liquid component from the urethane resin, the permeability of an ink is attempted to be increased. In order to sufficiently increase the aggregation speed of the urethane resin, the surface tension at a short lifetime determined by the maximum bubble pressure method is required to be greatly reduced. However, when the surface tension is greatly reduced, it is difficult to maintain the character quality of a recorded image at a high level.

Based on the above study results, the inventors of the present invention have further studied while focusing on the constitution of a urethane resin contained in an ink and on characteristics of dynamic surface tension of an ink. The study has revealed that it is effective that a urethane resin satisfying the following requirements (1) and (2) is contained and the dynamic surface tension in a lifetime of 10 msec (milliseconds) is adjusted at 55 mN/m or more.

(1) Having a unit derived from a polyisocyanate, a unit derived from a polyol having no acid group and a unit derived from a polyol having an acid group.

(2) The proportion of a unit derived from the polyol having an acid group present at the molecular terminal relative to the whole unit derived from the polyol having an acid group is 30% or less.

In order to improve the highlighter resistance of an image immediately after recording, it is important to allow the urethane resin in an ink to rapidly aggregate. When an ink is applied onto a recording medium, the urethane resin aggregates due to the reaction with a cationic component contained in the recording medium or an increase in salt concentration associated with the permeation of a liquid component or with water evaporation. It is supposed that the urethane resin is thus bonded to the surface of a pigment layer or between pigment particles to exhibit excellent highlighter resistance. However, when an ink has a high surface tension at a short lifetime determined by the maximum bubble pressure method, a liquid component permeates into a recording medium very slowly. On this account, it is supposed that the aggregation of the urethane resin is insufficient immediately after recording and sufficient strength is not achieved.

The inventors of the present invention have studied a urethane resin that can aggregate rapidly even when a large amount of a liquid component is still contained in an ink. The study has revealed that the proportion of a unit derived from a polyol having an acid group present at the molecular terminal of a urethane resin closely relates to the aggregation speed of the urethane resin. The study has further revealed that a urethane resin having a smaller proportion of the unit derived from the polyol having an acid group present at the molecular terminal aggregates more rapidly.

It is supposed that the urethane resin having an acid group in the molecule is stably present in an aqueous medium contained in an ink as the acid group dissociates into ions. The urethane resin in an ink applied to a recording medium loses the ionic dissociation state to cause aggregation. It is supposed that the elimination of the "ionic dissociation state" is not locally caused in the molecule of a urethane resin but is caused at any positions in the molecule. In a urethane resin having a small proportion of an acid group present at the molecular terminal, the electrostatic repulsion between the acid group in an ionic dissociation state at the molecular terminal and the acid group in an ionic dissociation state in the molecule is weak, and the urethane resin rapidly aggregates on the elimination of the ionic dissociation state.

The inventors of the present invention have further studied the relation between the aggregation speed of a urethane resin and the proportion of a unit derived from a polyol having an acid group present at the molecular terminal of a urethane resin. Specifically, inks containing several urethane resins different in proportion of the unit derived from a polyol having an acid group present at the molecular terminal were used to record images, and the highlighter resistance of the images immediately after the recording was evaluated. When an ink containing the urethane resin in which the proportion of the unit derived from a polyol having an acid group present at the molecular terminal relative to the whole unit derived from a polyol having an acid group is more than 30% was used, the following result was obtained. In other words, the result has revealed that when a physical force is applied to a pigment layer immediately after recording, the pigment layer is easily destroyed to cause stain. In contrast, the result has revealed that when an ink contains a urethane resin in which the proportion of the unit derived from the polyol having an acid group present at the molecular terminal is 30% or less, the pigment layer is not destroyed even by application of a physical force, and no stain is caused. The above result indicates that when the proportion of the unit derived from a polyol having an acid group present at the molecular terminal relative to the whole unit derived from a polyol having an acid group is 30% or less, the highlighter resistance at a sufficient level is achieved even immediately after recording. In contrast, when the proportion is more than 30%, the highlighter resistance immediately after recording is insufficient.

Next, the reason why the dynamic surface tension of an ink is set at 55 mN/m or more at a lifetime of 10 msec will be described. The maximum bubble pressure method used to determine the dynamic surface tension in the present invention is a method of determining a surface tension by measuring a maximum pressure required for discharging a bubble extruded from a tip of a probe (capillary) immersed in a liquid for measurement. The lifetime is a time from a point at which a fresh surface is formed after release of a bubble to a point at which a maximum bubble pressure is obtained (a point at which the curvature radius of a bubble becomes equal to the radius of the tip of the probe) when bubbles are formed at the tip of the probe in the measurement by the maximum bubble pressure method.

In order to improve the character quality of an image to be recorded, it is important to suppress ink blurring on a recording medium caused when an ink permeates into the recording medium. When an ink is applied onto a recording medium, the pigment in the ink rapidly aggregates, and the pigment aggregate is formed on the surface of the recording medium. The pigment aggregation is accelerated as water evaporates from the ink. When an ink rapidly permeates into a recording medium, a pigment permeates into the recording medium while the pigment aggregation associated with water evaporation is still insufficient, thus blurring is caused, and the character quality cannot be improved. In contrast, when an ink permeates slowly, and a pigment aggregates sufficiently on the surface of a recording medium, blurring is unlikely to be caused, and excellent character quality can be achieved. In other words, in order to improve the character quality of an image, it is improvement to control the permeability of an ink.

Further studies have revealed that in order to record an image having excellent character quality by using an ink containing a urethane resin, it is important to control the dynamic surface tension of an ink at a lifetime of 10 msec. By using an ink containing a urethane resin and having a surface tension at a lifetime of 10 msec controlled at a predetermined value or more, an image having excellent character quality can be recorded. It is also revealed that an ink having a high surface tension at a lifetime of 10 msec hardly affects ink blurring even when the surface tension after a lifetime of 10 msec is markedly reduced. The inventors of the present invention assume the following reason for this.

In an ink, the hydrophobic moiety of a urethane resin interacts with the hydrophobic moiety of the particle surface of a pigment to form the state in which the urethane resin partially adsorbs to the pigment. This is supposed to improve the dispersion stability of the pigment as compared with the case containing no urethane resin. By the ink containing a urethane resin, it is thus assumed that the pigment slowly aggregates on the surface of a recording medium. Hence, it is supposed that in order to sufficiently allow a pigment to aggregate on the surface of a recording medium, the surface tension immediately after the application of an ink (i.e., at a shorter lifetime) is required to be controlled. Specifically, by adjusting the surface tension at a lifetime of 10 msec to a comparatively high value, a pigment is sufficiently allowed to aggregate even when a urethane resin is contained.

The inventors of the present invention further prepared a plurality of inks having different surface tensions at a lifetime of 10 msec and determined the surface tension at which an image having sufficient character quality was able to be recorded. The result has revealed that when the surface tension at a lifetime of 10 msec is 55 mN/m or more, the ink blurring on a recording medium is suppressed at a sufficient level, and an image having excellent character quality can be recorded. When the surface tension at a lifetime of 10 msec is 55 mN/m or more, a pigment can be held on the surface of a recording medium until sufficient aggregation. In contrast, when the surface tension at a lifetime of 10 msec is less than 55 mN/m, the permeation proceeds before a pigment sufficiently aggregates, thereby causing blurring to deteriorate the character quality.

<Ink>

The ink of the present invention is an aqueous ink for ink jet containing a pigment and a urethane resin. Components contained in the ink of the present invention and the like will next be described in detail.

(Pigment)

The ink of the present invention contains a pigment such as an inorganic pigment and an organic pigment as a coloring material. Examples of the inorganic pigment include carbon black. Examples of the organic pigment include azo, phthalocyanine, quinacridone, isoindolinone, imidazolone, diketopyrrolopyrrole and dioxazine pigments. These pigments can be used singly or in combination of two or more of them. The content (% by mass) of the pigment in the ink is preferably 0.10% by mass or more to 15.00% by mass or less and more preferably 1.00% by mass or more to 10.00% by mass or less based on the total mass of the ink.

Examples of the pigment, in terms of dispersion manner, include a resin-dispersed pigment containing a resin dispersant, a pigment dispersed by a surfactant and a microcapsule pigment prepared by covering at least a part of the particle surface of a pigment with a resin or the like. In addition, a self-dispersible pigment prepared by bonding a functional group including a hydrophilic group such as an anionic group to the particle surface of a pigment or a pigment prepared by chemically bonding an organic group including a polymer to the particle surface of a pigment (resin-bonded self-dispersible pigment) can also be used. In the ink of the present invention, a pigment in any dispersion manner can be used. Pigments different in dispersion manner can also be used in combination.

(Urethane Resin)

The urethane resin used in the ink of the present invention has a unit derived from a polyisocyanate, a unit derived from a polyol having no acid group and a unit derived from a polyol having an acid group. In the urethane resin, the proportion of a unit derived from the polyol having an acid group present at the molecular terminal relative to the whole unit derived from the polyol having an acid group is 30% or less. The proportion is based on mole (i.e., % by mole). The lower limit of the proportion is 0% or more. The "unit" in the urethane resin in the present invention means a repeating unit derived from a single monomer.

The content (% by mass) of the urethane resin in the ink is preferably 0.10% by mass or more to 10.00% by mass or less based on the total mass of the ink. When the content of the urethane resin is less than 0.10% by mass, the improvement effect of the highlighter resistance of an image may deteriorate. When the content of the urethane resin is more than 10.00% by mass, the ink viscosity is likely to increase, and the ejection stability may slightly decrease. As long as the effect of the invention is not impaired, a resin other than the urethane resin may be contained as needed.

The urethane resin preferably has a weight-average molecular weight of 5,000 or more to 150,000 or less that is determined by gel permeation chromatography (GPC) in terms of polystyrene. When a urethane resin has a weight-average molecular weight of less than 5,000, the improvement effect of the highlighter resistance of an image may deteriorate. When a urethane resin has a weight-average molecular weight of more than 150,000, the dispersion state of a pigment in the ink may be slightly destabilized, or a viscosity increase may reduce the ejection stability of the ink.

The urethane resin preferably has an acid value of 40 mg KOH/g or more to 140 mg KOH/g or less and more preferably 50 mg KOH/g or more to 100 mg KOH/g or less. The acid value is a value including the acid value based on a unit derived from a polyol having an acid group present at the molecular terminal of the urethane resin.

[Proportion of Urethane Bond]

The proportion of the urethane bond relative to the total amount of the urethane bond and the urea bond in the urethane resin is preferably 85.0% by mole or more. When the proportion of the urethane bond is less than 85.0% by mole, the ink is likely to deposit around ink ejection orifices on a recording head, and the ejection accuracy may deteriorate. The proportion of the urethane bond relative to the total amount of the urethane bond and the urea bond in the urethane resin is preferably 100.0% by mole or less.

[Form of Urethane Resin]

The urethane resin may be a resin that is dissolved in an aqueous medium included in the ink to be present in the form with no particle size (water-soluble urethane resin) or may be a resin that is dispersed in an aqueous medium included in the ink to be present in the form with a particle size (water-dispersible urethane resin). A water-insoluble urethane resin is present in the ink in the form of resin particles. In the present invention, a water-soluble urethane resin is preferably used.

Whether a urethane resin is "water-soluble" or "water-dispersible" can be determined by the following procedure. First, a liquid (resin solid content: 10% by mass) containing a urethane resin that is neutralized with an alkali (sodium hydroxide or potassium hydroxide, for example) in an amount corresponding to the acid value is prepared. Next, the prepared liquid is diluted 10-fold (in terms of volume) with pure water to prepare a sample solution. The particle size of the resin in the sample solution is then determined by dynamic light scattering. When particles having particle sizes are observed, such a urethane resin can be determined to be "water-dispersible". The conditions for the measurement can be as follows, for example: SetZero: 30 seconds; number of measurement times: 3; measurement time: 180 seconds; shape: spherical; and refractive index: 1.59. As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions and the like are not limited to the above.

[Polyisocyanate]

A polyisocyanate is the compound having two or more isocyanate groups in the molecular structure thereof. Examples of the polyisocyanate include aliphatic polyisocyanates and aromatic polyisocyanates. The proportion of the unit derived from a polyisocyanate relative to the urethane resin (% by mole) is preferably 10.0% by mole or more to 80.0% by mole or less and more preferably 20.0% by mole or more to 60.0% by mole or less. The proportion of the unit derived from a polyisocyanate relative to the urethane resin (% by mass) is preferably 10.0% by mass or more to 80.0% by mass or less.

Examples of the aliphatic polyisocyanate include polyisocyanates having a chain structure, such as tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanate methyl) cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate and α,α,α',α'-tetramethylxylylene diisocyanate.

Of the above polyisocyanates, isophorone diisocyanate is preferably used because the highlighter resistance of an image immediately after recording can be further improved. The molecular structure of the urethane resin contains a hard segment composed of a polyisocyanate, a chain extender and the like and a soft segment composed of a polyol and the like. The hard segment is a segment mainly contributing to toughness, and the soft segment is a segment mainly contributing to flexibility. These segments have a microphase-separated structure. It is assumed that when isophorone diisocyanate is used as the polyisocyanate, the formed hard segment can have a higher adsorbability to a pigment, and thus the urethane resin is likely to be bonded to the pigment in a pigment layer. This is supposed to be due to characteristics arising from a cyclic structure having a methyl group. As a result, the binding properties with a pigment can be improved and the highlighter resistance of an image immediately after recording can be further improved.

[Polyol, Polyamine]

A polyol is the compound having two or more hydroxy groups in the molecular structure thereof. Examples of the polyol include polyols having no acid group, such as polyether polyols, polyester polyols and polycarbonate polyols; and polyols having an acid group. A polyamine is the compound having two or more "amino groups or imino groups" in the molecular structure thereof. The proportion of the units derived from a polyol and a polyamine (% by mole) relative to the urethane resin is preferably 10.0% by mole or more to 80.0% by mole or less and more preferably 20.0% by mole or more to 60.0% by mole or less.

[Polyol Having No Acid Group]

Examples of the polyether polyol include addition polymers of an alkylene oxide and a polyol; and glycols such as (poly)alkylene glycols. Examples of the alkylene oxide include ethylene oxide, propylene oxide, butylene oxide and α-olefin oxides. Examples of the polyol to be subjected to addition polymerization with an alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea and derivatives thereof: and triols such as glycerol, trimethylolpropane, 1,2,5-hexanetriol, 1,2,6-hexanetriol, pentaerythritol, trimethylolmelamine and derivatives thereof and polyoxypropylene triol. Examples of the glycol include (poly)alkylene glycols such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol and neopentyl glycol; and ethylene glycol-propylene glycol copolymers.

Examples of the polyester polyol include acid esters. Examples of the acid component constituting the acid esters include aromatic dicarboxylic acids such as phthalic acid, naphthalenedicarboxylic acid, biphenyldicarboxylic acid and tetrahydrophthalic acid; alicyclic dicarboxylic acids such as hydrogenated products of these aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkylsuccinic acids, linoleic acid, maleic acid, fumaric acid, mesaconic acid, citraconic acid and itaconic acid.

Anhydrides, salts and derivatives (including alkyl esters and acid halides) thereof are also usable as the acid component, for example. Examples of the component to form an ester with the acid component include polyols such as diols and triols; and glycols such as (poly)alkylene glycols. Examples of the polyols and the glycols include those exemplified as the components constituting the above polyether polyol.

As the polycarbonate polyol, a polycarbonate polyol produced by a known method can be used. Specific examples include alkane diol-type polycarbonate diols such as polyhexamethylene carbonate diol. Other examples include polycarbonate diols prepared by reacting a carbonate component such as alkylene carbonates, diaryl carbonates and dialkyl carbonates or phosgene with an aliphatic diol component.

The polyol having no acid group preferably has a carbon number of 10 or more. The polyol having no acid group preferably has a number-average molecular weight of 600 or more to 4,000 or less. When a polyol having no acid group has a number-average molecular weight of less than 600, the formed film is likely to have lower flexibility, and the improvement effect of the highlighter resistance of an image may slightly deteriorate. When a polyol having no acid group has a number-average molecular weight of more than 4,000, the formed film is likely to have higher flexibility, and the improvement effect of the highlighter resistance of an image may slightly deteriorate.

In the urethane resin, the proportion of the unit derived from a polyol having no acid group (% by mole) relative to the total amount of the unit derived from a polyol is preferably within the following range. In other words, the proportion is preferably 5.0% by mole or more to 50.0% by mole or less and more preferably 10.0% by mole or more to 30.0% by mole or less. In the urethane resin, the proportion of the unit derived from a polyol having no acid group (% by mass) is preferably 5.0% by mass or more to 60.0% by mass or less.

Of the above polyols having no acid group, the polyether polyol is preferably used. The polyether polyol has high affinity with water, and thus a urethane resin having a unit derived from the polyether polyol has high flowability in an aqueous ink. On this account, a urethane resin containing the polyether polyol can aggregate more rapidly, and the highlighter resistance of an image immediately after recording can be further improved. Of the polyether polyols, polypropylene glycol is specifically preferably used. By using the urethane resin having a unit derived from polypropylene glycol, the character quality of an image to be recorded can be further improved. The inventors of the present invention suggest that the reason why such an effect is achieved is as the following mechanisms. In other words, a methyl group branched from the main chain in the molecule of polypropylene glycol further increases the hydrophobic interaction with a pigment, and thus a liquid component is more likely to be separated from the periphery of the pigment. It is supposed that this promotes the solid-liquid separation of an ink applied to a recording medium and the aggregation of a pigment is further accelerated.

[Polyol Having an Acid Group]

Examples of the polyol having an acid group include polyols having an acid group such as a carboxylic acid group, a sulfonic acid group, a phosphoric acid group and a phosphonic acid group. The acid group is preferably a carboxylic acid group. Examples of the polyol having a carboxylic acid group include dimethylolacetic acid, dimethylolpropionic acid, dimethylolbutanoic acid and dimethylolbutyric acid. Of them, dimethylolpropionic acid and dimethylolbutanoic acid are preferred. Dimethylolpropionic acid and dimethylolbutanoic acid have small steric hindrance around the acid group in terms of structure. On this account, when an ink is applied onto a recording medium, the ionic dissociation state of the acid group of a urethane resin is more rapidly eliminated to accelerate the aggregation. Hence, by using at least one of dimethylolpropionic acid and dimethylolbutanoic acid as the polyol having an acid group, the highlighter resistance of an image immediately after recording can be further improved, and thus such a condition is preferred.

The acid group of the polyol having an acid group may be in a salt form. Examples of the cation forming a salt include ions of alkali metals such as lithium, sodium and potassium, an ammonium ion and cations of organic amines such as dimethylamine. The molecular weight of a general-purpose polyol having an acid group is at most about 400, and thus the unit derived from a polyol having an acid group basically constitutes a hard segment of a urethane resin. The acid group in the urethane resin is mainly derived from the acid group of the unit derived from a polyol having an acid group. The acid value of a urethane resin can be controlled by the amount of a polyol having an acid group.

In the urethane resin, the proportion of the unit derived from a polyol having an acid group (% by mole) relative to the total amount of the unit derived from a polyol is preferably within the following range. In other words, the proportion is preferably 30.0% by mole or more to 90.0% by mole or less and more preferably 50.0% by mole or more to 90.0% by mole or less.

[Polyamine]

Examples of the polyamine include monoamines having a plurality of hydroxy groups, such as dimethylolethylamine, diethanolmethylamine, dipropanolethylamine and dibutanolmethylamine; bifunctional polyamines such as ethylenediamine, propylenediamine, hexylenediamine, isophoronediamine, xylylenediamine, diphenylmethanediamine, hydrogenated diphenylmethane diamine and hydrazine; and three or more functional polyamines such as diethylenetriamine, triethylenetetramine, tetraethylenepentamine, polyamide polyamine and polyethylene polyimine. For convenience, compounds having a plurality of hydroxy groups and a single "amino group or imino group" are also exemplified as the "polyamine". The molecular weight of a polyamine is at most about 400, and thus the unit derived from a polyamine basically constitutes a hard segment of a urethane resin. The proportion of the unit derived from a polyamine (% by mole) relative to the urethane resin is preferably 10.0% by mole or less and more preferably 5.0% by mole or less. The proportion of the unit derived from a polyamine (% by mole) relative to the urethane resin may be 0.0% by mole.

[Crosslinking Agent, Chain Extender]

To synthesize the urethane resin, a crosslinking agent or a chain extender can be used. Typically, the crosslinking agent is used to synthesize a prepolymer, and the chain extender is used when a previously synthesized prepolymer is subjected to a chain extension reaction. Basically, the crosslinking agent and the chain extender can be appropriately selected from water, polyisocyanates, polyols, polyamines and the like depending on a purpose such as crosslinking and chain extension. As the chain extender, an agent capable of crosslinking a urethane resin can also be used.

[Analytical Method]

(1) The formulation; (2) the proportion of the unit derived from the polyol having an acid group present at the molecular terminal relative to the whole unit derived from the polyol having an acid group; and (3) the proportion of the urethane bond relative to the total amount of the urethane bond and the urea bond of the urethane resin in an ink can be analyzed by the respective methods shown below.

The formulation of a urethane resin can be analyzed by the following method. First, a method of extracting the urethane resin from an ink containing a urethane resin will be described. For example, to a supernatant liquid prepared by centrifugation of an ink at 80,000 rpm, an excess amount of an acid (hydrochloric acid, for example) is added to precipitate a resin. Alternatively, a urethane resin may be separated by drying the above supernatant liquid. Alternatively, an organic solvent that does not dissolve a pigment or an acrylic resin but dissolves a urethane resin (hexane or chloroform, for example) can be used to extract the urethane resin from an ink. Although the urethane resin present in an ink can be analyzed, analysis of the urethane resin extracted from an ink can improve the measurement accuracy, and thus the extraction is preferred.

The separated urethane resin is dried and then dissolved in deuterated dimethyl sulfoxide (deuterated DMSO) to give a sample for measurement. The prepared measurement sample is analyzed by proton nuclear magnetic resonance method ($^1$H-NMR), and from the positions of obtained peaks, the types of a polyisocyanate, a polyol having no acid group, a polyol having an acid group and the like can be identified. From the ratio of integrated values of peaks at chemical shifts of corresponding components, the composition ratio can also be calculated. Alternatively, pyrolysis gas chromatographic analysis of a urethane resin also enables identification of the types of a polyisocyanate, a polyol having no acid group, a polyol having an acid group and the like. In addition, by the analysis by carbon nuclear magnetic resonance method ($^{13}$C-NMR), the repetition number of units derived from a polyol is determined, and the number-average molecular weight can be calculated.

In the urethane resin, the proportion of the unit derived from the polyol having an acid group present at the molecular terminal relative to the whole unit derived from the polyol having an acid group can be analyzed by the following method. First, the urethane resin extracted from an ink by the above method is analyzed by pyrolysis gas chromatography to identify the types of a polyisocyanate, a polyol having no acid group and a polyol having an acid group. Next, a reaction product of the identified polyisocyanate and the polyol having an acid group is dissolved in deuterated DMSO and is analyzed by $^{13}$C-NMR. By the analysis, the chemical shift of the carbonyl carbon (at a lower magnetic field side) in a unit derived from the polyol having an acid group present at the molecular terminal is determined. The chemical shift of the carbonyl carbon (at a higher magnetic field side) in a unit derived from the polyol having an acid group present in the molecule is also determined.

Next, the proportion of the integrated value of the peak of the carbonyl carbon in the unit derived from the polyol having an acid group present at the molecular terminal relative to the total integrated value of the peaks of the carbonyl carbons in the unit derived from the polyol having an acid group is calculated. In this manner, in a urethane resin, the proportion of the unit derived from the polyol having an acid group present at the molecular terminal relative to the whole unit derived from the polyol having an acid group can be determined. For example, when dimethylolpropionic acid (DMPA) is used, the peak of the carbonyl carbon in a unit derived from the polyol having an acid group present at the molecular terminal is detected around 176 ppm, which may slightly vary depending on measurement conditions. The peak of the carbonyl carbon in the unit derived from the polyol having an acid group present in the molecule is detected around 175 ppm. When dimethylolbutanoic acid (DMBA) is used, the peak of the carbonyl carbon in a unit derived from the polyol having an acid group present at the molecular terminal is detected around 175 ppm. The peak of the carbonyl carbon in the unit derived from the polyol having an acid group present in the molecule is detected around 174 ppm.

In a urethane resin, the proportion of the urethane bond relative to the total amount of the urethane bond and the urea bond can be analyzed by the following method. First, the urethane resin extracted from an ink by the above method is analyzed by pyrolysis gas chromatography to identify the types of a polyisocyanate, a polyol having no acid group and a polyol having an acid group. A reaction product of the identified polyisocyanate and the polyol having an acid group and a reaction product of the polyisocyanate and the polyol having no acid group are separately prepared. Each solution of the prepared reaction products in deuterated DMSO is analyzed by $^{13}$C-NMR to assign the chemical shift of the urethane bond. A reaction product of the polyisocyanate and water is also analyzed by $^{13}$C-NMR in a similar manner to assign the chemical shift of the urea bond. From the ratio of the integrated values of peaks at these chemical shifts, the proportion of the urethane bond relative to the total amount of the urethane bond and the urea bond in a urethane resin can be determined.

(Aqueous Medium)

The ink of the present invention is an aqueous ink containing an aqueous medium including water. As the water, deionized water (ion-exchanged water) is preferably used. The content (% by mass) of water in the ink is preferably 10.00% by mass or more to 90.00% by mass or less and more preferably 50.00% by mass or more to 90.00% by mass or less based on the total mass of the ink.

The aqueous medium may further contain a water-soluble organic solvent. The water-soluble organic solvent may be any water-soluble solvent, and a monohydric alcohol, a polyhydric alcohol, a (poly)alkylene glycol, a glycol ether, a nitrogen-containing polar solvent, a sulfur-containing polar solvent or the like can be used. The content (% by mass) of the water-soluble organic solvent in the ink is preferably 3.00% by mass or more to 50.00% by mass or less based on the total mass of the ink. Of the water-soluble organic solvents, a polyhydric alcohol such as 1,2-hexanediol is preferably used. By adding such a component to an aqueous ink that contains a urethane resin, has a high dynamic surface tension at a short lifetime determined by the maximum bubble pressure method, and is likely to give a lower ejection accuracy, the ejection accuracy can be efficiently improved. However, 1,2-hexanediol markedly reduces the dynamic surface tension at a lifetime of 10 msec of an ink, and thus is preferably used in an extremely small amount when used.

(Other Additives)

The ink of the present invention can also contain water-soluble organic compounds that are solid at normal temperature, including polyhydric alcohols such as trimethylolpropane and trimethylolethane and urea derivatives such as urea and ethylene urea, as necessary, in addition to the above-mentioned components. The ink of the present invention may further contain various additives such as a surfactant, a pH adjuster, an anticorrosive, an antiseptic agent, an antifungal agent, an antioxidant, a reduction inhibitor, an evaporation accelerator, a chelating agent and a water-soluble resin, as needed.

The ink of the present invention preferably further contains a polyoxyethylene alkyl ether (surfactant) having an HLB value of 13.0 or more that is determined by Griffin's method. By adding a polyoxyethylene alkyl ether having an HLB value of 13.0 or more, the ejection accuracy can be improved. As described above, an aqueous ink containing a urethane resin and having a high dynamic surface tension at a short lifetime determined by the maximum bubble pressure method may have a low flowability on a water-repellent face. On this account, when an ink jet recording apparatus including a recording head having a water-repellent surface subjected to water-repellent treatment as an ejection orifice face provided with an ejection orifice is used to record an image, the ejection accuracy may deteriorate at the time of recording immediately after recovery operation such as ink aspiration or wiping. The ink on a water-repellent face is temporarily spread on an ejection orifice face by wiping and then rapidly forms round drops. However, an ink having low flowability takes a long time from the spread by wiping to the formation of round drops, and thus at the time of recording immediately after wiping, the ink is still spread on the vicinity of ejection orifices. Hence, the ink ejection is likely to be disturbed, and the ejection accuracy is likely to deteriorate. In contrast, by adding, to an ink, a polyoxyethylene alkyl ether having a linear structure, having an HLB value of 13.0 or more, and having an appropriate hydrophilic-hydrophobic balance, the ink ejection accuracy can be improved. It is supposed that such a polyoxyethylene alkyl ether strongly interacts with a urethane resin in an ink and can effectively suppress the adsorption of the urethane resin to a water-repellent face.

The content (% by mass) of the polyoxyethylene alkyl ether having an HLB value of 13.0 or more in the ink is preferably 0.20% by mass or more to 1.00% by mass or less based on the total mass of the ink. When the content of the polyoxyethylene alkyl ether is less than 0.20% by mass, the ejection accuracy may not be sufficiently improved. When the content of the polyoxyethylene alkyl ether is more than 1.00% by mass, a formed pigment layer may have an insufficient strength, and the highlighter resistance may be slightly reduced.

The HLB value by the Griffin's method is determined from the formula weight of the ethylene oxide group of a surfactant and the molecular weight in accordance with expression (1) and is a physical property value ranging from 0.0 to 20.0 and indicating the degree of hydrophilicity or lipophilicity of a surfactant. A smaller HLB value indicates a higher lipophilicity (hydrophobicity) of a surfactant. A larger HLB value indicates a higher hydrophilicity of a surfactant.

$$HLB\ value = 20 \times (\text{formula weight of ethylene oxide group of surfactant/molecular weight of surfactant}) \quad (1)$$

The polyoxyethylene alkyl ether, for example, has a structure represented by R—O—(CH$_2$CH$_2$O)$_m$H (R: an alkyl group, m: an integer). In the polyoxyethylene alkyl ether having an HLB value of 13.0 or more, the carbon number of R (alkyl group) as a hydrophobic group in the formula is preferably in such a range as to provide a surface activating power. More specifically, the carbon number of R (alkyl group) in the formula is preferably 12 or more to 22 or less. Examples of R (alkyl group) in the formula include a lauryl group (12), a cetyl group (16), a stearyl group (18), an oleyl group (18) and a behenyl group (22) (values in parentheses are the carbon number of an alkyl group). In the formula, m (repetition number of an ethylene oxide group) is determined by the structure of R and an HLB value. Specifically, m in the formula is preferably 10 or more to 50 or less and more preferably 10 or more to 40 or less.

(Physical Properties of Ink)

The dynamic surface tension of the ink at a lifetime of 10 msec determined by the maximum bubble pressure method is required to be 55 mN/m or more. When the dynamic surface tension at a lifetime of 10 msec is less than 55 mN/m, an image having excellent character quality cannot be recorded. The dynamic surface tension of the ink at a lifetime of 10 msec is preferably 60 mN/m or less. The dynamic surface tension of an ink at a lifetime of 10 msec can be easily controlled by appropriately selecting the amount or the type of the water-soluble organic solvent or the surfactant. However, a water-soluble organic solvent having a high permeability or a surfactant unlikely to form micelle markedly reduces the dynamic surface tension of an ink at a lifetime of 10 msec, and thus such a component is preferably used in an extremely small amount when used.

The ink preferably has a pH of 5.0 or more to 10.0 or less and more preferably 7.0 or more to 9.5 or less at 25° C. The ink preferably has a static surface tension of 30 mN/m or more to 45 mN/m or less and more preferably 35 mN/m or more to 40 mN/m or less at 25° C. The ink preferably has a viscosity of 1.0 mPa·s or more to 5.0 mPa·s or less at 25° C.

<Recording Apparatus>

FIG. 1 is a perspective view schematically showing an example of a principal part of an ink jet recording apparatus. In the ink jet recording apparatus shown in the figure, a carriage 100 is fixed to an endless belt 5 and is movable along a guide shaft 3. The endless belt 5 is wound by a pair of pulleys 503, and one pulley 503 is connected to a driving shaft of a main scanning motor (not shown) that drives the carriage. Hence, as the motor is driven to rotate, the carriage 100 reciprocates and sweeps along the guide shaft 3 in a main scanning direction that is the scanning direction of a recording head 1. On the carriage 100, a head cartridge 400 removably holding ink cartridges 410 and having the recording head 1 is installed. The head cartridge also has a connector that receives signals and the like for driving the recording head. By driving an electrothermal converter provided on the recording head in response to electric signals, an ink can be ejected or an ejection orifice face (water-repellent face) with ejection orifices can be heated.

Figure 2:
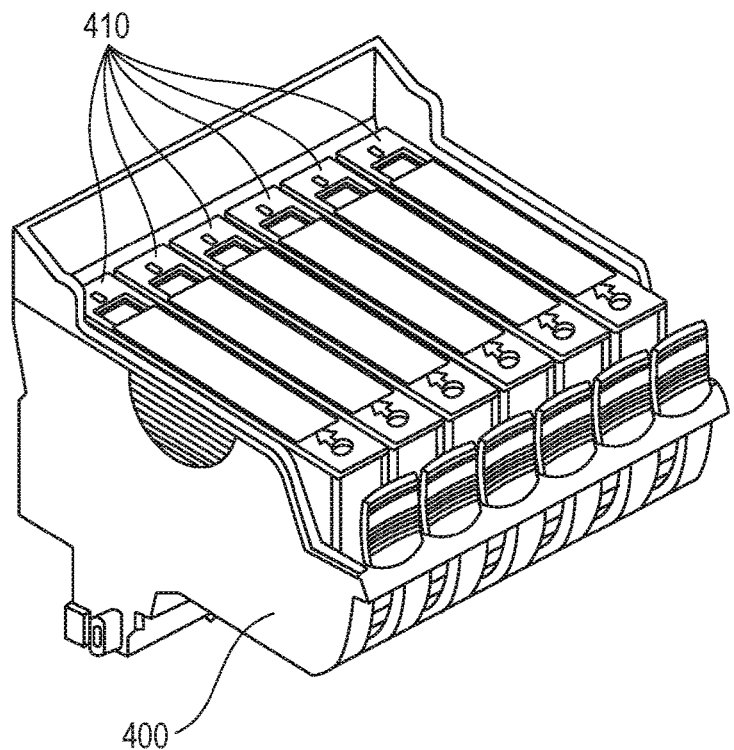
FIG. 2 is a perspective view showing an example of a head cartridge that can be installed on a carriage of the ink jet recording apparatus shown in FIG. 1.

FIG. 2 is a perspective view showing an example of a head cartridge that can be installed on the carriage of the ink jet recording apparatus shown in FIG. 1. The head cartridge 400 shown in FIG. 2 includes ink cartridges 410 that include ink storage portions storing inks and supply the inks to the ink jet recording head 1. The recording head 1 (FIG. 3) is positioned on the bottom face of the head cartridge 400. The head cartridge 400 is so installed on the carriage 100 that ejection orifice arrays provided on the recording head 1 for corresponding ink types face a recording medium 6 (FIG. 1) and the array direction coincides with a direction orthogonal to the main scanning direction (sub scanning direction that is the conveyance direction of the recording medium 6). The number of sets of ejection orifice arrays and ink cartridges 410 can depend on the ink types used. In the example shown in FIGS. 1 and 2, six sets are provided corresponding to six colors (for example, black, cyan, magenta, yellow, light cyan and light magenta).

Recording media 6 are intermittently conveyed in a direction orthogonal to the scanning direction of the carriage 100 (FIG. 1). A recording medium 6 is supported by a pair of roller units (not shown) provided at an upstream side and a downstream side in the conveyance direction and is conveyed while a certain tension is applied, and flatness is maintained with respect to the ejection orifices. While the recording in the width direction corresponding to the array width of ejection orifices of the recording head 1 associated with the movement of the carriage 100 and the conveyance of the recording medium 6 are alternately repeated, the recording on the whole recording medium 6 is performed. The object recording medium to be recorded by using the ink of the present invention may be any recording medium but is preferably a paper-based recording medium having permeability, such as plain paper and recording media having a coating layer (glossy paper and art paper). Specifically, a recording medium having no coating layer, such as plain paper is preferably used.

The apparatus shown in FIG. 1 includes a linear encoder 4 for detecting the position of the carriage in the main scanning direction, for example. The carriage 100 is positioned at a home position that faces a maintenance mechanism 7 at the time of non-recording including the time of record start (FIG. 1). During recording, the carriage also moves to the home position as needed. Near the home position, the maintenance mechanism 7 including a cap unit (not shown) and the cleaning unit described later (FIG. 3) is provided. The cap unit is so supported as to be capable of moving up and down, and at the higher position, can perform capping of an ejection orifice face of the recording head 1 to protect the ejection orifice face at the time of non-recording or to perform suction recovery. At the time of recording operation, the cap unit is positioned at a lower position to prevent the interference with the recording head and can face the ejection orifice face that performs preliminary ejection.

Figure 3:
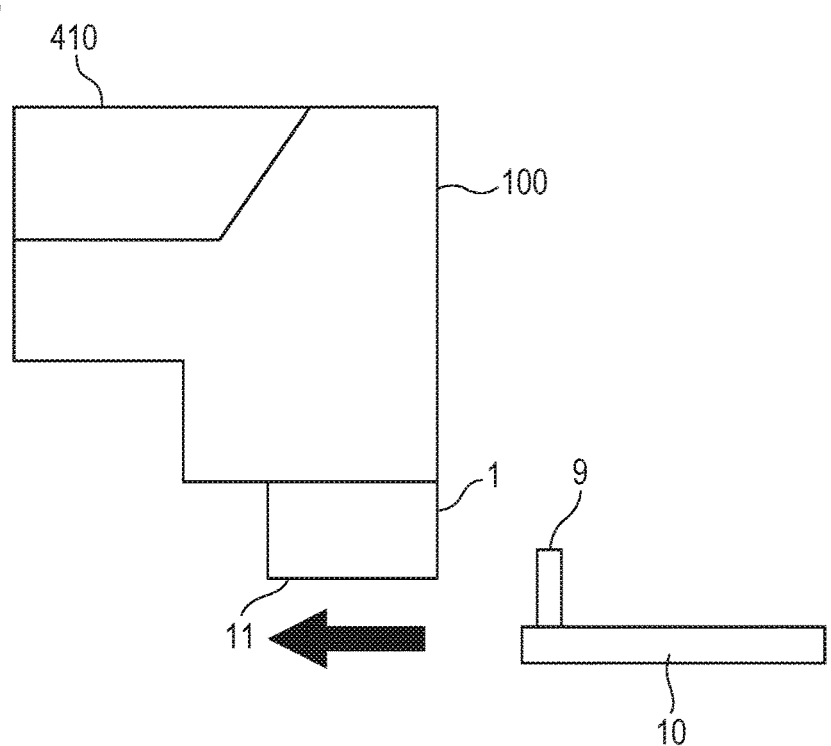
FIG. 3 is a side view schematically showing an example of a cleaning unit.

FIG. 3 is a side view schematically showing an example of a cleaning unit. For simple explanation, only the recording head 1 is shown in the head cartridge. As shown in FIG. 3, a wiper 9 made of an elastic member such as rubber is fixed to a wiper holder 10. The wiper holder 10 is movable in the crosswise direction in FIG. 3, or in a direction orthogonal to the scanning direction of the recording head 1. The wiper 9 is configured to bend at the time of sliding contact with the ejection orifice face 11 having ejection orifice on the recording head 1 and the side or body thereof can slide on the ejection orifice face. In order to improve wiping accuracy, a plurality of wipers 9 may be provided. The intrusion amount of the wiper 9 on the ejection orifice face 11 is not limited. To perform cleaning operation, the recording head 1 is conveyed to the home position, and then the wiper holder 10 is conveyed in the arrow direction. During the conveyance, the wiper 9 comes into contact with and slides on the ejection orifice face 11 to perform wiping. The wiping speed follows the conveyance speed of the wiper holder 10, and a speed in a practicable range can achieve the effect. Specifically, the wiping speed is preferably 20 mm/sec or more to 300 mm/sec or less.

(Recording Head)

Figure 4:
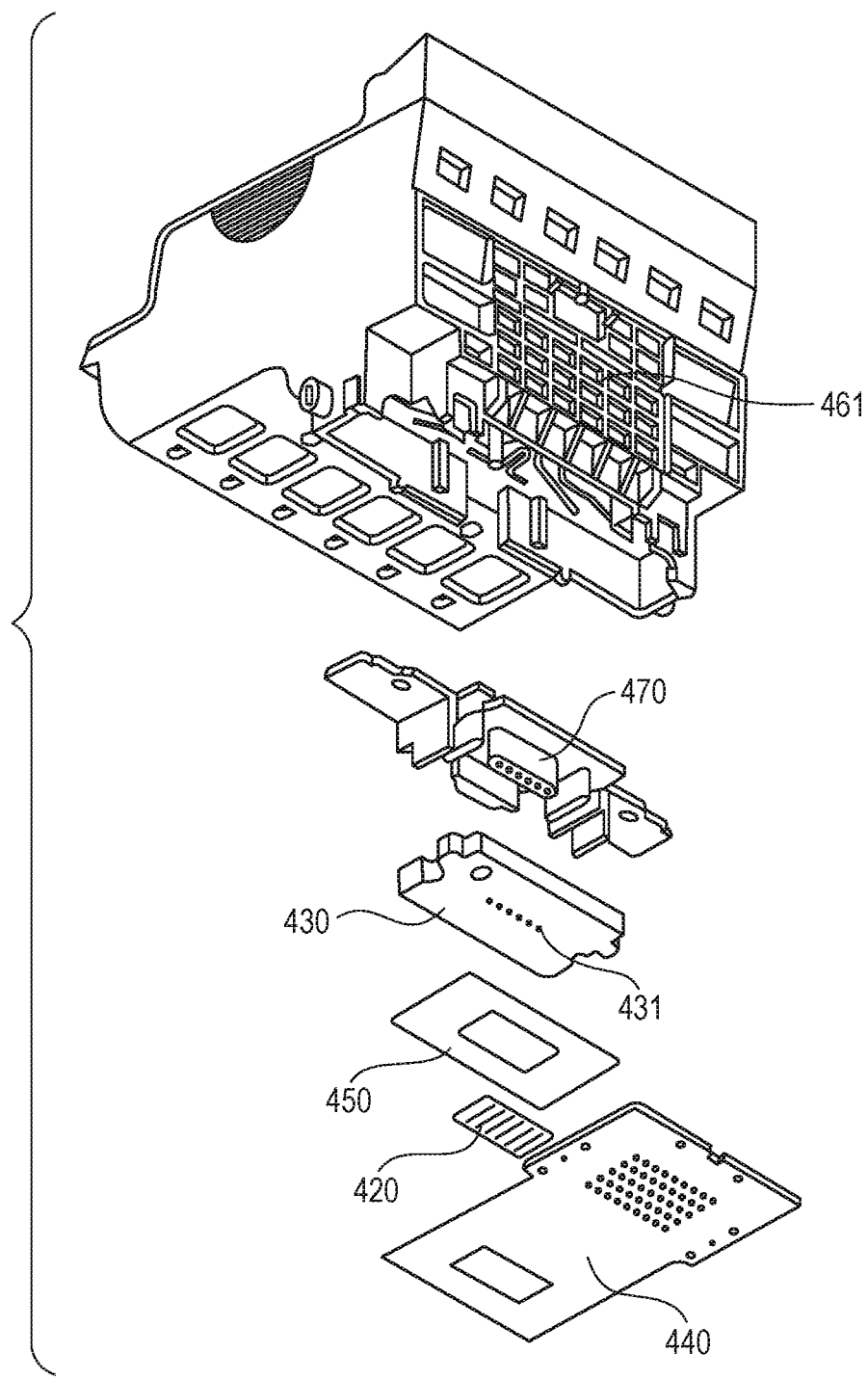
FIG. 4 is a partially exploded perspective view of the head cartridge shown in FIG. 2.

FIG. 4 is a partially exploded perspective view of the head cartridge shown in FIG. 2. The recording head of the head cartridge 400 shown in FIG. 2, as shown in FIG. 4, includes a recording element substrate 420, a first plate 430, an electric wiring board 440, a second plate 450, a cartridge holder 461 and a flow path forming member 470. The recording element substrate 420 having ejection orifice arrays for inks is bonded and fixed onto the first plate 430 made from a material having heat dissipation properties, such as aluminum oxide ($Al_2O_3$). The first plate 430 has ink supply ports 431 for supplying inks to the recording element substrate 420 and is bonded and fixed to the second plate 450 having an opening. The second plate 450 is provided in order to level the ejection orifice face of the recording element substrate 420 with the surface of the electric wiring board 440 that applies electric signals to eject inks. On the second plate 450, the electric wiring board 440 and the recording element substrate 420 are bonded and fixed so as to form electrical connection. Meanwhile, to the lower part of the cartridge holder 461 detachably holding the ink cartridges 410, the flow path forming member 470 is bonded by ultrasonic welding to form ink flow paths (not shown) from the ink cartridges 410 to the first plate 430.

Figure 5:
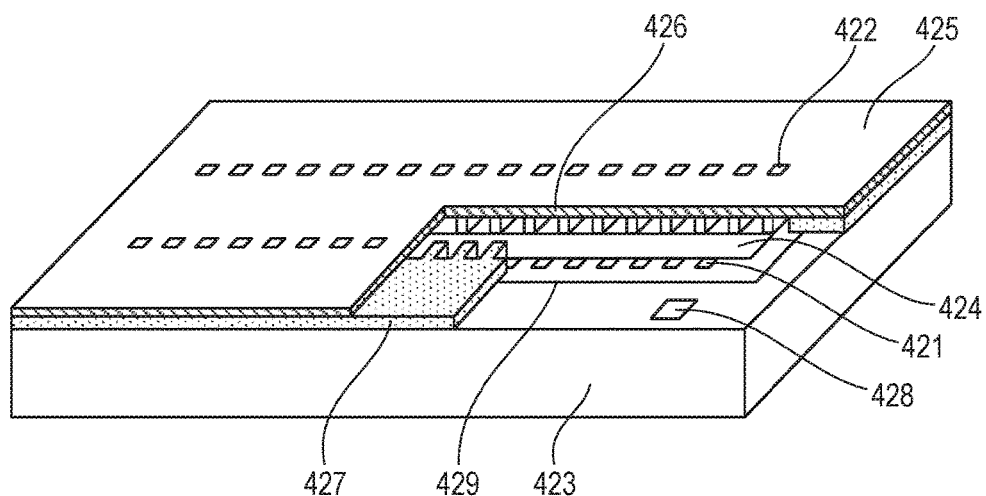
FIG. 5 is a partially broken perspective view showing the structure near ejection orifices of a recording element substrate shown in FIG. 4.

FIG. 5 is a partially broken perspective view showing the structure around the ejection orifices of the recording element substrate shown in FIG. 4. In FIG. 5, 421 is a first electrothermal converter (heater) that generates thermal energy in response to the application of electric current to cause film boiling of an ink, as the energy used for ejecting an ink. On a substrate 423 on which the electrothermal converters 421 are mounted, a temperature sensor 428 for sensing the temperature of the recording element substrate 420 and a second electrothermal converter 429 (sub-heater) for heating in order to maintain the temperature of the recording head or inks depending on a sensed temperature are provided. 422 is an ejection orifice, 424 is an ink supply port, and 426 is a flow path wall. 425 is an ejection orifice plate having ejection orifices 422 that face the heaters (first electrothermal converters 421) for ejecting inks, and is provided above the substrate 423 through a film layer 427 made from a resin or the like. The surface of the ejection orifice plate 425 (the ejection orifice face facing a recording medium) is a water-repellent face by water repellent treatment. The recording apparatus may have the structure in which an environmental temperature (ambient temperature) thereof is sensed, and temperature conditions of heating including warming are set depending on the temperature. Even in a case not using thermal energy for ejecting inks, such as a piezoelectric system, use of a heater corresponding to the second electrothermal converter 429 enables heating of the water-repellent face.

The method of forming a water-repellent face by water repellent treatment of an ejection orifice face with ejection orifices can be selected from a method of spraying a water-repellent material for coating, a method of attaching a water-repellent material by vacuum deposition or plasma polymerization and similar methods. The water-repellent face is preferably formed as a uniform film made from a water-repellent material. The water repellency of a formed water-repellent face can be determined by measuring the contact angle of a water droplet on the member surface thereof. When having a water contact angle of 70 degrees or more, a face can be considered to have water repellency. The water contact angle is preferably 90 degrees or more. The water contact angle can be determined by using pure water (ion-exchanged water) with a common contact angle meter. Examples of such a contact angle meter include an automatic contact angle meter (trade name "CA-W", manufactured by Kyowa Interface Science Co., Ltd.).

As the water-repellent material, for example, a fluororesin compound is preferably used. In particular, the water-repellent face is preferably formed as a uniform resin film of a fluororesin compound, and the resin film is preferably free from metals such as nickel. Examples of the fluororesin compound include polytetrafluoroethylene resins and fluororesins having a cyclic structure. Specific examples include trade name "Polyflon PTFE" (manufactured by Daikin Industries, Ltd.), trade name "Teflon (registered trademark) PTFE" (manufactured by DuPont) and trade name "CYTOP" (manufactured by Asahi Glass). Other resins containing a fluorine atom, such as a fluorinated epoxy resin, a fluorinated polyimide resin, a fluorinated polyamide resin, a fluorinated acrylic resin, a fluorinated urethane resin, a fluorinated siloxane resin and modified resins thereof can also be used. As the water-repellent material, a compound containing a silicon atom or a silicone resin can also be used. Specifically, the water-repellent material is preferably a condensation product of a hydrolyzable silane compound having a fluoroalkyl group and a hydrolyzable silane compound having a cationically polymerizable group, which achieves high water repellency and durability. A resin prepared by curing the condensation product by irradiation with active energy rays such as ultraviolet rays can also be used. These hydrolyzable silane compounds have a hydrolyzable group in the molecular structure thereof. Examples of the hydrolyzable group include alkoxy groups. Examples of the cationically polymerizable group include cyclic ether groups and cyclic vinyl ether groups.

In the example shown in FIG. 5, two lines of electrothermal converters 421 and two lines of ejection orifices 422 are provided. In addition, the electrothermal converters 421 in a line and the ejection orifices 422 in the corresponding line are displaced by ½ of the line pitch in the line direction (sub scanning direction). In each line, 128 electrothermal converters 421 or 128 ejection orifices 422 are arranged at a density of 600 dpi to achieve a resolution of 1,200 dpi for each ink. The recording element substrate configurations corresponding to the above six inks are placed on the first plate 430 (FIG. 4).

EXAMPLES

The present invention will next be described in further detail with reference to examples, reference examples and comparative examples, but the invention is not intended to be limited to the following examples without departing from the scope of the invention. The component amounts with "part" or "%" are based on mass unless otherwise noted.

<Synthesis of Urethane Resin>

A four-necked flask equipped with a stirrer, a thermometer, a nitrogen gas inlet tube and a reflux condenser was prepared. In the four-necked flask, a polyisocyanate, a polyol having no acid group and some of a polyol having an acid group (amount a) in types and amounts shown in Table 1 and 200.0 parts of methyl ethyl ketone were placed. The mixture was then reacted at 80° C. for 6 hours in a nitrogen gas atmosphere. Next, a chain extender, a terminating agent and the remainder (amount b) of the polyol having an acid group in types and amounts shown in Table 1 and 100.0 parts of methyl ethyl ketone were added. The residual proportion of an isocyanate group was checked by FT-IR, and the mixture was reacted at 80° C. until an intended residual proportion was achieved, giving a reaction liquid. The resulting reaction liquid was cooled to 40° C., then ion-exchanged water was added, and an aqueous potassium hydroxide solution was added while the mixture was stirred at a high speed with a homomixer, giving a liquid. From the resulting liquid, methyl ethyl ketone was distilled off under heat and reduced pressure, giving a liquid containing one of urethane resins 1 to 23 at a urethane resin content (solid content) of 20.0%. Each of the obtained urethane resins 1 to 23 was water-soluble. The components in Table 1 are shown below in detail.

IPDI: isophorone diisocyanate
HDI: hexamethylene diisocyanate
MDI: diphenylmethane diisocyanate
H12MDI: dicyclohexylmethane-4,4'-diisocyanate
PPG: polypropylene glycol (number-average molecular weight: 2,000)
PEG: polyethylene glycol (number-average molecular weight: 2,000)
PTMG: polytetramethylene glycol (number-average molecular weight: 2,000)
PES: polyester polyol (number-average molecular weight: 2,000)
PC: polycarbonate polyol (number-average molecular weight: 2,000)
DMPA: dimethylolpropionic acid
DMBA: dimethylolbutanoic acid
EDA: ethylenediamine
DETA: diethylenetriamine
TETA: triethylenetetramine
MeOH: methanol

TABLE 1

Synthetic conditions and properties of urethane resins

| Urethane resin | Polyisocyanate Type | Amount (parts) | Type | Amount (parts) | Polyol having no acid group Type | Amount (parts) | Polyol having an acid group Type | Amount a (parts) | Amount b (parts) | Chain extender Type | Amount (parts) | Terminating agent Type | Amount (parts) |
|---|---|---|---|---|---|---|---|---|---|---|---|---|---|
| 1 | IPDI | 28.0 | HDI | 10.7 | PPG | 39.8 | DMPA | 18.2 | 3.3 | | | | |
| 2 | IPDI | 16.3 | HDI | 6.2 | PPG | 67.9 | DMPA | 8.1 | 1.5 | | | | |
| 3 | IPDI | 41.7 | | | PPG | 36.8 | DMPA | 18.2 | 3.3 | | | | |
| 4 | IPDI | 41.7 | | | PPG | 36.2 | DMPA | 18.2 | 3.3 | EDA | 0.6 | | |
| 5 | IPDI | 41.7 | | | PPG | 36.2 | DMPA | 18.2 | 3.3 | DETA | 0.6 | | |
| 6 | IPDI | 41.7 | | | PPG | 36.1 | DMPA | 18.2 | 3.3 | TETA | 0.7 | | |
| 7 | IPDI | 41.7 | | | PPG | 40.1 | DMPA | 13.2 | 2.4 | EDA | 0.6 | MeOH | 2.0 |
| 8 | IPDI | 41.7 | | | PPG | 36.8 | DMPA | 21.5 | | | | | |
| 9 | IPDI | 41.7 | | | PPG | 36.8 | DMPA | 14.9 | 6.6 | | | | |
| 10 | IPDI | 41.7 | | | PES | 36.8 | DMPA | 18.2 | 3.3 | | | | |
| 11 | IPDI | 41.7 | | | PC | 36.8 | DMPA | 18.2 | 3.3 | | | | |
| 12 | IPDI | 41.5 | | | PPG | 34.8 | DMBA | 20.1 | 3.6 | | | | |
| 13 | MDI | 46.4 | | | PPG | 32.1 | DMPA | 18.2 | 3.3 | | | | |
| 14 | H12MDI | 48.4 | | | PPG | 30.1 | DMPA | 18.2 | 3.3 | | | | |
| 15 | HDI | 32.4 | | | PPG | 46.1 | DMPA | 18.2 | 3.3 | | | | |

TABLE 1-continued

Synthetic conditions and properties of urethane resins

| Urethane resin | Polyisocyanate Type | Amount (parts) | Type | Amount (parts) | Polyol having no acid group Type | Amount (parts) | Polyol having an acid group Type | Amount a (parts) | Amount b (parts) | Chain extender Type | Amount (parts) | Terminating agent Type | Amount (parts) |
|---|---|---|---|---|---|---|---|---|---|---|---|---|---|
| 16 | IPDI | 41.7 |   |   | PEG | 36.8 | DMPA | 18.2 | 3.3 |   |   |   |   |
| 17 | IPDI | 41.7 |   |   | PTMG | 36.8 | DMPA | 18.2 | 3.3 |   |   |   |   |
| 18 | IPDI | 32.5 | HDI | 12.4 | PPG | 33.6 | DMPA | 18.2 | 3.3 |   |   |   |   |
| 19 | IPDI | 31.2 | HDI | 11.9 | PPG | 35.4 | DMPA | 18.2 | 3.3 |   |   |   |   |
| 20 | IPDI | 30.9 | HDI | 11.8 | PPG | 35.8 | DMPA | 18.2 | 3.3 |   |   |   |   |
| 21 | IPDI | 26.7 | HDI | 10.2 | PPG | 41.6 | DMPA | 18.2 | 3.3 |   |   |   |   |
| 22 | IPDI | 41.7 |   |   | PPG | 36.8 | DMPA | 14.8 | 6.7 |   |   |   |   |
| 23 | IPDI | 41.7 |   |   | PPG | 36.8 | DMPA | 10.7 | 10.8 |   |   |   |   |

<Properties of Urethane Resin>

Various physical property values of the prepared urethane resins were determined by the following methods.

(Acid Value)

Hydrochloric acid was added to a liquid containing a urethane resin to precipitate the urethane resin. The resin dried under vacuum at 40° C. overnight was dissolved in tetrahydrofuran to prepare a sample. The sample was subjected to potentiometric titration using a potassium hydroxide-methanol titration solution to determine the acid value of the urethane resin. The results are shown in Table 2.

(Proportion of Unit Derived from Polyol Having Acid Group Present at Molecular Terminal)

Hydrochloric acid was added to a liquid containing a urethane resin to precipitate the urethane resin. The dried resin was dissolved in deuterated DMSO to prepare a measurement sample. The prepared sample was analyzed by $^{13}$C-NMR (apparatus name "Avance 500", manufactured by BRUKER Bio Spin). The proportion of the integrated value of the peak of the carbonyl carbon in the unit derived from a polyol having an acid group present at the molecular terminal relative to the total integrated value of the peaks of the carbonyl carbons in the units derived from a polyol having an acid group was calculated. The value (proportion) calculated as above was regarded as the "proportion of the unit derived from the polyol having an acid group present at the molecular terminal". For example, when DMPA is used, the peak of the carbonyl carbon in the unit derived from the polyol having an acid group present at the molecular terminal is detected around 176 ppm, which may slightly vary depending on measurement conditions. The peak of the carbonyl carbon in the unit derived from the polyol having an acid group present in the molecule is detected around 175 ppm. The results are shown in Table 2 as "proportion of terminal acid group (%)".

(Proportion of Urethane Bond)

Hydrochloric acid was added to a liquid containing a urethane resin to precipitate the urethane resin. The dried resin was dissolved in deuterated DMSO to prepare a measurement sample. The prepared sample was analyzed by $^{13}$C-NMR (apparatus name "Avance 500", manufactured by BRUKER Bio Spin), and from the obtained integrated values of the peaks of a urethane bond and a urea bond, the proportion of the urethane bond in the urethane resin was calculated. For example, in the case of a urethane resin prepared from isophorone diisocyanate, the peak of the urethane bond is detected around 155 ppm, which may slightly vary depending on measurement conditions or the formulation of a urethane resin. The peak of the urea bond is detected around 158 ppm. The results are shown in Table 2.

In a urethane resin, the content of the urethane bond relative to the total content of the urethane bond and the urea bond was controlled by the following procedure. The isocyanate group in a polyisocyanate reacts with hydroxy groups in a polyol having no acid group and in a polyol having an acid group, and the amount thereof gradually decreases. The residual proportion of the isocyanate group was determined occasionally. When the residual proportion reached a predetermined value, ion-exchanged water was added, and the residual isocyanate group was reacted with water to form a urea bond, thereby controlling the content of the urethane bond.

TABLE 2

Synthetic conditions and properties of urethane resins

| Urethane resin | Acid value (mgKOH/g) | Proportion of terminal acid group (%) | Proportion of urethane bond (% by mole) |
|---|---|---|---|
| 1 | 90 | 15 | 95.0 |
| 2 | 40 | 15 | 95.0 |
| 3 | 90 | 15 | 95.0 |
| 4 | 90 | 15 | 95.0 |
| 5 | 90 | 15 | 95.0 |
| 6 | 90 | 15 | 95.0 |
| 7 | 65 | 15 | 95.0 |
| 8 | 90 | 0 | 95.0 |
| 9 | 90 | 30 | 95.0 |
| 10 | 90 | 15 | 95.0 |
| 11 | 90 | 15 | 95.0 |
| 12 | 90 | 15 | 95.0 |
| 13 | 90 | 15 | 95.0 |
| 14 | 90 | 15 | 95.0 |
| 15 | 90 | 15 | 95.0 |
| 16 | 90 | 15 | 95.0 |
| 17 | 90 | 15 | 95.0 |
| 18 | 90 | 15 | 80.0 |
| 19 | 90 | 15 | 84.0 |
| 20 | 90 | 15 | 85.0 |
| 21 | 90 | 15 | 100.0 |
| 22 | 90 | 31 | 95.0 |
| 23 | 90 | 50 | 95.0 |

<Synthesis of Acrylic Resin>

A four-necked flask equipped with a stirrer, a reflux condenser and a nitrogen gas inlet tube was prepared. In the four-necked flask, 200.0 parts of ethylene glycol monobutyl ether was placed, then was stirred in a nitrogen gas atmosphere and heated to 130° C. Monomers in types and amounts shown in Table 3 and 4.0 parts of a polymerization initiator (t-butyl peroxide) were added dropwise over 3 hours. After aging for 2 hours, the ethylene glycol monobutyl ether was distilled off under reduced pressure to give a resin. To the obtained resin, potassium hydroxide in an amount equivalent to the acid value thereof and an appropriate amount of ion-exchanged water were added, and the resin was dissolved by heating at 80° C. In this manner, liquids containing acrylic resins 1 to 5 at an acrylic resin content (solid content) of 20.0% were prepared. To the obtained liquid containing an acrylic resin, hydrochloric acid was added to precipitate the resin. The resin dried under vacuum at 40° C. overnight was dissolved in tetrahydrofuran to give a measurement sample. The sample was subjected to potentiometric titration using a potassium hydroxide-methanol titration solution to determine the acid value of the acrylic resin. The results are shown in Table 3. The components in Table 3 are shown below in detail.

St: styrene
α-MSt: α-methylstyrene
BA: butyl acrylate
BzMA: benzyl methacrylate
MMA: methyl methacrylate
AA: acrylic acid

TABLE 3

Synthetic conditions and properties of acrylic resins

| Acrylic resin | St | α-MSt | BA | BzMA | MMA | AA | Acid value (mgKOH/g) |
|---|---|---|---|---|---|---|---|
| 1 | 65.0 | | 20.0 | | | 15.0 | 120 |
| 2 | 73.0 | | 20.0 | | | 7.0 | 40 |
| 3 | 60.0 | 9.0 | | | | 31.0 | 240 |
| 4 | 69.0 | 10.0 | | | | 21.0 | 160 |
| 5 | | | | 59.0 | 20.0 | 21.0 | 160 |

<Preparation of Pigment Dispersion Liquid>
(Pigment Dispersion Liquid 1)

A solution prepared by dissolving 5.0 g of concentrated hydrochloric acid in 5.5 g of water was cooled to 5° C., and 1.5 g of 4-amino-1,2-benzenedicarboxylic acid (treatment agent) was added. A container containing the solution was placed in an ice bath to cool to 10° C. or less, and a solution prepared by dissolving 1.8 g of sodium nitrite in 9 g of water at 5° C. was added. After stirring for 15 minutes, 6.0 g of a pigment (carbon black, trade name "NIPex170IQ", manufactured by Orion Engineered Carbons) was added under stirring, and the whole was further stirred for 15 minutes, giving a slurry. The obtained slurry was filtered through a filter paper (trade name "Standard filter paper No. 2", manufactured by ADVANTEC), and then the obtained particles were thoroughly washed with water. The water-washed particles were dried in an oven at 110° C., giving a self-dispersible pigment. To the obtained self-dispersible pigment, water was added so as to give a pigment content of 10.0%, giving a dispersion liquid. The sodium ions in the dispersion liquid were ion-exchanged to potassium ions by an ion exchange method, giving a pigment dispersion liquid 1 in which a self-dispersible pigment containing carbon black having the particle surface to which a —$C_6H_3$—$(COOK)_2$ group was bonded was dispersed in water.

(Pigment Dispersion Liquid 2)
The same procedure as the case of the pigment dispersion liquid 1 was performed except that the pigment type was changed to C.I. Pigment Blue 15:3, giving a pigment dispersion liquid 2. In the pigment dispersion liquid 2, the pigment content was 10.0%.

(Pigment Dispersion Liquid 3)
The same procedure as the case of the pigment dispersion liquid 1 was performed except that the pigment type was changed to C.I. Pigment Red 122, giving a pigment dispersion liquid 3. In the pigment dispersion liquid 3, the pigment content was 10.0%.

(Pigment Dispersion Liquid 4)
The same procedure as the case of the pigment dispersion liquid 1 was performed except that the pigment type was changed to C.I. Pigment Yellow 74, giving a pigment dispersion liquid 4. In the pigment dispersion liquid 4, the pigment content was 10.0%.

(Pigment Dispersion Liquid 5)
First, 10.0 parts of a pigment (carbon black, trade name "NIPex170IQ", manufactured by Orion Engineered Carbons), 20.0 parts of a liquid containing the acrylic resin 4 (resin content: 20.0%) and 70.0 parts of ion-exchanged water were mixed. The mixture was dispersed for 3 hours in a batch type vertical sand mill, and then was subjected to pressure filtration through a microfilter with a pore size of 1.2 μm (manufactured by Fujifilm Corporation). Water was added to give a pigment dispersion liquid 5 having a pigment content of 10.0% and a resin content of 4.0%.

(Pigment Dispersion Liquid 6)
To a solution prepared by dissolving 7.5 mmol of 3-aminobenzylamine in 30.0 g of water, 1.2 g of silver nitrate was added under stirring. The generated precipitate was filtered off to give a filtrate. To a suspension prepared by dispersing 10.0 g of a pigment (carbon black, trade name "NIPex170IQ", manufactured by Orion Engineered Carbons) in 70 g of water, the above filtrate was added under stirring. Next, 1.6 g of concentrated hydrochloric acid was added, and a solution prepared by dissolving 0.6 g of sodium nitrite in 10.0 g of water was further added. The formation of bubbles of nitrogen gas generated by reaction of carbon black with a diazonium salt derived from an amino group directly bonded to the benzene ring was stopped, and then the product was dried in an oven at 120° C., giving a pigment in which functional groups including an amino group were bonded to the particle surface. The functional group density on the particle surface was 1.5 μmol/m$^2$ that was determined from counter ions measured by using an ion chromatograph (trade name "Ion chromatograph DX320", manufactured by DIONEX). To 1,000 g of a liquid containing the acrylic resin 4 (resin content: 20.0%), a dispersion liquid prepared by dispersing 50.0 g of the obtained pigment in 1,450 g of ion-exchanged water was added under stirring, giving a mixture. The obtained mixture was placed on an evaporating dish, then was heated at 150° C. for 15 hours to evaporate the liquid component, and was cooled to room temperature, giving a product dried by evaporation. To a distilled water adjusted to have a pH of 9.0 with sodium hydroxide, the product dried by evaporation was added and dispersed, and to the dispersion under stirring, a 1.0 mol/L aqueous sodium hydroxide solution was added to adjust the pH at 10 to 11. In this manner, a part of the amino group included in the functional groups bonded to the particle surface of the carbon black and the carboxylic acid group of the resin were dehydrated and condensed. Then, demineralization, purification for removing impurities and removal of coarse particles were performed, giving a pigment dispersion liquid 6 having a carbon black content of 10.0% and a resin content of 4.0%. Thermal analysis of the obtained pigment dispersion liquid 6 revealed that a functional group containing the acrylic resin 4 was bonded to the particle surface of the pigment.

<Preparation of Ink>

(Inks 1 to 57)

Components (unit: %) shown in middle rows in Tables 5-1 to 5-3 were mixed and thoroughly stirred, and the mixtures were subjected to pressure filtration through a microfilter with a pore size of 3.0 μm (manufactured by Fujifilm Corporation), giving inks 1 to 57. The prepared inks had a viscosity ranging from 2.5 to 3.5 mPa·s at 25° C. The structures and the HLB values of the surfactants used are shown in Table 4. The HLB values were determined by the above Griffin's method. NIKKOL BC-20, BO-50, BL-21, BO-20, BB-20, BC15, BT-12, BO-15 and BC-10 are the trade names of surfactants manufactured by Nikko Chemicals. EMALEX 1825, 1615, CS-30 and 512 are the trade names of surfactants manufactured by Nihon Emulsion. Acetylenol E100 listed for reference is the trade name of a surfactant manufactured by Kawaken Fine Chemicals. The dynamic surface tension $\gamma_{10}$ was determined at 25° C. with a dynamic surface tensiometer (trade name "BUBBLE PRESSURE TENSIOMETER BP-2", manufactured by KRUSS Co.) by the maximum bubble pressure method.

TABLE 4

Structures and HLB values of surfactants

| Surfactant | Trade name | Structure | HLB value |
|---|---|---|---|
| 1 | NIKKOL BO-50 | Polyoxyethylene oleyl ether | 17.8 |
| 2 | NIKKOL BL-21 | Polyoxyethylene lauryl ether | 16.6 |
| 3 | EMALEX 1825 | Polyoxyethylene isostearyl ether | 16.1 |
| 4 | NIKKOL BC-20 | Polyoxyethylene cetyl ether | 15.7 |
| 5 | NIKKOL BO-20 | Polyoxyethylene oleyl ether | 15.3 |
| 6 | NIKKOL BB-20 | Polyoxyethylene behenyl ether | 14.6 |
| 7 | NIKKOL BC-15 | Polyoxyethylene cetyl ether | 14.6 |
| 8 | EMALEX 1615 | Polyoxyethylene isocetyl ether | 14.6 |
| 9 | NIKKOL BT-12 | Polyoxyethylene sec-tridecyl ether | 14.5 |
| 10 | NIKKOL BO-15 | Polyoxyethylene oleyl ether | 14.2 |
| 11 | EMALEX CS-30 | Polyoxyethylene cholesteryl ether | 14.0 |
| 12 | EMALEX 512 | Polyoxyethylene oleyl ether | 13.3 |
| 13 | NIKKOL BC-10 | Polyoxyethylene cetyl ether | 12.9 |
| 14 | Acetylenol E100 | Ethylene oxide adduct of acetylene glycol | 13.3 |

TABLE 5

Formulations and properties of inks

| | Ink | | | | | | | | | |
|---|---|---|---|---|---|---|---|---|---|---|
| | 1 | 2 | 3 | 4 | 5 | 6 | 7 | 8 | 9 | 10 |
| Pigment dispersion liquid type | 1 | 2 | 3 | 4 | 5 | 6 | 1 | 1 | 1 | 1 |
| Urethane resin type | 1 | 1 | 1 | 1 | 1 | 1 | 2 | 3 | 4 | 5 |
| Acrylic resin type | 1 | 1 | 1 | 1 | 1 | 1 | 1 | 1 | 1 | 1 |
| Surfactant type | 4 | 4 | 4 | 4 | 4 | 4 | 4 | 4 | 4 | 4 |
| Pigment dispersion liquid | 30.00 | 30.00 | 30.00 | 30.00 | 30.00 | 30.00 | 30.00 | 30.00 | 30.00 | 30.00 |
| Liquid containing urethane resin | 2.00 | 2.00 | 2.00 | 2.00 | 2.00 | 2.00 | 2.00 | 2.00 | 2.00 | 2.00 |
| Liquid containing acrylic resin | 3.00 | 3.00 | 3.00 | 3.00 | 3.00 | 3.00 | 3.00 | 3.00 | 3.00 | 3.00 |
| 1,2-Hexanediol | 0.20 | 0.20 | 0.20 | 0.20 | 0.20 | 0.20 | 0.20 | 0.20 | 0.20 | 0.20 |
| Diethylene glycol monoethyl ether | | | | | | | | | | |
| Diethylene glycol monobutyl ether | | | | | | | | | | |
| Triethylene glycol monobutyl ether | | | | | | | | | | |
| Glycerol | 9.00 | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 |
| Surfactant | 0.20 | 0.20 | 0.20 | 0.20 | 0.20 | 0.20 | 0.20 | 0.20 | 0.20 | 0.20 |
| Pure water | 45.60 | 45.60 | 45.60 | 45.60 | 45.60 | 45.60 | 45.60 | 45.60 | 45.60 | 45.60 |
| Dynamic surface tension $\gamma_{10}$(mN/m) | 57 | 57 | 57 | 57 | 57 | 57 | 57 | 57 | 57 | 57 |

| | Ink | | | | | | | | |
|---|---|---|---|---|---|---|---|---|---|
| | 11 | 12 | 13 | 14 | 15 | 16 | 17 | 18 | 19 |
| Pigment dispersion liquid type | 1 | 1 | 1 | 1 | 1 | 1 | 1 | 1 | 1 |
| Urethane resin type | 6 | 7 | 8 | 9 | 1 | 1 | 1 | 1 | 10 |
| Acrylic resin type | 1 | 1 | 1 | 1 | — | — | 1 | 1 | 1 |
| Surfactant type | 4 | 4 | 4 | 4 | 4 | 4 | 4 + 23 | 4 | 4 |
| Pigment dispersion liquid | 30.00 | 30.00 | 30.00 | 30.00 | 30.00 | 30.00 | 30.00 | 30.00 | 30.00 |
| Liquid containing urethane resin | 2.00 | 2.00 | 2.00 | 2.00 | 2.00 | 5.00 | 2.00 | 2.00 | 2.00 |
| Liquid containing acrylic resin | 3.00 | 3.00 | 3.00 | 3.00 | | | 3.00 | 3.00 | 3.00 |

TABLE 5-continued

| Formulations and properties of inks | | | | | | | | | |
|---|---|---|---|---|---|---|---|---|---|
| 1,2-Hexanediol | 0.20 | 0.20 | 0.20 | 0.20 | 0.20 | 0.20 | 0.20 | | 0.20 |
| Diethylene glycol monoethyl ether | | | | | | | | | |
| Diethylene glycol monobutyl ether | | | | | | | | | |
| Triethylene glycol monobutyl ether | | | | | | | | | |
| Glycerol | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Surfactant | 0.20 | 0.20 | 0.20 | 0.20 | 0.20 | 0.20 | 0.20 + 0.03 | 0.20 | 0.20 |
| Pure water | 45.60 | 45.60 | 45.60 | 45.60 | 48.60 | 45.60 | 45.57 | 45.80 | 45.60 |
| Dynamic surface tension $\gamma_{10}$(mN/m) | 57 | 57 | 57 | 57 | 57 | 57 | 55 | 60 | 57 |

| | Ink | | | | | | | | | | |
|---|---|---|---|---|---|---|---|---|---|---|---|
| | 20 | 21 | 22 | 23 | 24 | 25 | 26 | 27 | 28 | 29 | 30 |
| Pigment dispersion liquid type | 1 | 1 | 1 | 1 | 1 | 1 | 1 | 1 | 1 | 1 | 1 |
| Urethane resin type | 11 | 12 | 13 | 14 | 15 | 16 | 17 | 18 | 19 | 20 | 21 |
| Acrylic resin type | 1 | 1 | 1 | 1 | 1 | 1 | 1 | 1 | 1 | 1 | 1 |
| Surfactant type | 4 | 4 | 4 | 4 | 4 | 4 | 4 | 4 | 4 | 4 | 4 |
| Pigment dispersion liquid | 30.00 | 30.00 | 30.00 | 30.00 | 30.00 | 30.00 | 30.00 | 30.00 | 30.00 | 30.00 | 30.00 |
| Liquid containing urethane resin | 2.00 | 2.00 | 2.00 | 2.00 | 2.00 | 2.00 | 2.00 | 2.00 | 2.00 | 2.00 | 2.00 |
| Liquid containing acrylic resin | 3.00 | 3.00 | 3.00 | 3.00 | 3.00 | 3.00 | 3.00 | 3.00 | 3.00 | 3.00 | 3.00 |
| 1,2-Hexanediol | 0.20 | 0.20 | 0.20 | 0.20 | 0.20 | 0.20 | 0.20 | 0.20 | 0.20 | 0.20 | 0.20 |
| Diethylene glycol monoethyl ether | | | | | | | | | | | |
| Diethylene glycol monobutyl ether | | | | | | | | | | | |
| Triethylene glycol monobutyl ether | | | | | | | | | | | |
| Glycerol | 9.00 | 9.00 | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 | 5.00 |
| Surfactant | 0.20 | 0.20 | 0.20 | 0.20 | 0.20 | 0.20 | 0.20 | 0.20 | 0.20 | 0.20 | 0.20 |
| Pure water | 45.60 | 45.60 | 45.60 | 45.60 | 45.60 | 45.60 | 45.60 | 45.60 | 45.60 | 45.60 | 45.60 |
| Dynamic surface tension $\gamma_{10}$(mN/m) | 57 | 57 | 57 | 57 | 57 | 57 | 57 | 57 | 57 | 57 | 57 |

| | Ink | | | | | | | |
|---|---|---|---|---|---|---|---|---|
| | 31 | 32 | 33 | 34 | 35 | 36 | 37 | 38 |
| Pigment dispersion liquid type | 1 | 1 | 1 | 1 | 1 | 1 | 1 | 1 |
| Urethane resin type | 1 | 1 | 1 | 1 | 1 | 1 | 1 | 1 |
| Acrylic resin type | 1 | 1 | 1 | 1 | 1 | 1 | 1 | 1 |
| Surfactant type | 1 | 2 | 3 | 5 | 6 | 7 | 8 | 9 |
| Pigment dispersion liquid | 30.00 | 30.00 | 30.00 | 30.00 | 30.00 | 30.00 | 30.00 | 30.00 |
| Liquid containing urethane resin | 2.00 | 2.00 | 2.00 | 2.00 | 2.00 | 2.00 | 2.00 | 2.00 |
| Liquid containing acrylic resin | 3.00 | 3.00 | 3.00 | 3.00 | 3.00 | 3.00 | 3.00 | 3.00 |
| 1,2-Hexanediol | 0.20 | 0.20 | 0.20 | 0.20 | 0.20 | 0.20 | 0.20 | 0.20 |
| Diethylene glycol monoethyl ether | | | | | | | | |
| Diethylene glycol monobutyl ether | | | | | | | | |
| Triethylene glycol monobutyl ether | | | | | | | | |
| Glycerol | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 |
| Surfactant | 0.20 | 0.20 | 0.20 | 0.20 | 0.20 | 0.20 | 0.20 | 0.20 |
| Pure water | 45.60 | 45.60 | 45.60 | 45.60 | 45.60 | 45.60 | 45.60 | 45.60 |
| Dynamic surface tension $\gamma_{10}$(mN/m) | 57 | 57 | 57 | 57 | 57 | 57 | 57 | 57 |

TABLE 5-continued

Formulations and properties of inks

| | Ink | | | | | | | | | |
|---|---|---|---|---|---|---|---|---|---|---|
| | 39 | 40 | 41 | 42 | 43 | 44 | 45 | 46 | 47 | 48 |
| Pigment dispersion liquid type | 1 | 1 | 1 | 1 | 1 | 1 | 1 | 1 | 1 | 1 |
| Urethane resin type | 1 | 1 | 1 | 1 | 1 | 1 | — | — | — | — |
| Acrylic resin type | 1 | 1 | 1 | 1 | 1 | 1 | 1 | 2 | 3 | 4 |
| Surfactant type | 10 | 11 | 12 | 13 | 14 | — | 4 | 4 | 4 | 4 |
| Pigment dispersion liquid | 30.00 | 30.00 | 30.00 | 30.00 | 30.00 | 30.00 | 30.00 | 30.00 | 30.00 | 30.00 |
| Liquid containing urethane resin | 2.00 | 2.00 | 2.00 | 2.00 | 2.00 | 2.00 | | | | |
| Liquid containing acrylic resin | 3.00 | 3.00 | 3.00 | 3.00 | 3.00 | 3.00 | 3.00 | 3.00 | 3.00 | 3.00 |
| 1,2-Hexanediol | 0.20 | 0.20 | 0.20 | 0.20 | 0.20 | 0.20 | 0.20 | 0.20 | 0.20 | 0.20 |
| Diethylene glycol monoethyl ether | | | | | | | | | | |
| Diethylene glycol monobutyl ether | | | | | | | | | | |
| Triethylene glycol monobutyl ether | | | | | | | | | | |
| Glycerol | 9.00 | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 |
| Surfactant | 0.20 | 0.20 | 0.20 | 0.20 | 0.02 | | 0.20 | 0.20 | 0.20 | 0.20 |
| Pure water | 45.60 | 45.60 | 45.60 | 45.60 | 45.78 | 45.80 | 47.60 | 47.60 | 47.60 | 47.60 |
| Dynamic surface tension $\gamma_{10}$ (mN/m) | 57 | 57 | 57 | 57 | 57 | 57 | 57 | 57 | 57 | 57 |

| | Ink | | | | | | | | |
|---|---|---|---|---|---|---|---|---|---|
| | 49 | 50 | 51 | 52 | 53 | 54 | 55 | 56 | 57 |
| Pigment dispersion liquid type | 1 | 1 | 1 | 1 | 1 | 1 | 1 | 1 | 1 |
| Urethane resin type | — | 22 | 23 | 1 | 1 | 1 | 1 | 1 | 1 |
| Acrylic resin type | 5 | 1 | 1 | 1 | 1 | 1 | 1 | 1 | 1 |
| Surfactant type | 4 | 4 | — | 14 | 14 | — | — | — | — |
| Pigment dispersion liquid | 30.00 | 30.00 | 30.00 | 30.00 | 30.00 | 30.00 | 30.00 | 30.00 | 30.00 |
| Liquid containing urethane resin | | 2.00 | 2.00 | 2.00 | 2.00 | 2.00 | 2.00 | 2.00 | 2.00 |
| Liquid containing acrylic resin | 3.00 | 3.00 | 3.00 | 3.00 | 3.00 | 3.00 | 3.00 | 3.00 | 3.00 |
| 1,2-Hexanediol | 0.20 | 0.20 | 0.20 | 0.20 | | 0.30 | | | |
| Diethylene glycol monoethyl ether | | | | | | | 1.00 | | |
| Diethylene glycol monobutyl ether | | | | | | | | 1.00 | |
| Triethylene glycol monobutyl ether | | | | | | | | | 1.00 |
| Glycerol | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Surfactant | 0.20 | 0.20 | | 0.04 | 0.10 | | | | |
| Pure water | 47.60 | 45.60 | 45.80 | 45.76 | 45.90 | 45.70 | 45.00 | 45.00 | 45.00 |
| Dynamic surface tension $\gamma_{10}$ (mN/m) | 57 | 57 | 57 | 54 | 50 | 54 | 54 | 54 | 54 |

(Ink 58)

A urethane resin PU1 was synthesized in accordance with the description in the synthetic method of polyurethane dispersion PU1 in Japanese Translation of PCT International Publication No. 2005-515289, and an ink 58 was prepared in accordance with the formulation in Example 5. The synthesized urethane resin had an acid value of 21.4 mg KOH/g, a terminal acid group proportion of 0% and a urethane bond proportion of 70.0%. The formulation of the ink 58 was as shown below, and the dynamic surface tension $\gamma_{10}$ was 40 mN/m. Surfynol 465 (trade name) is a surfactant (an ethylene oxide adduct of acetylene glycol) manufactured by Air Products and Chemicals. The pure water contained triethanolamine so as to give an ink having a pH of 8.

Pigment (SDP black, solid content): 4.0%
Acrylic resin (acrylic binder 58/20/10/2, solid content): 0.5%
Urethane resin (PU1, solid content): 0.5%
Glycerol: 3.0%
Ethylene glycol: 4.0%
Surfynol 465: 1.0%
Pure water: residual amount to give a total amount of 100.0%

(Ink 59)

A polyurethane 1 was synthesized in accordance with the description in Synthesis Example 1 in Japanese Patent Application Laid-Open No. 2008-179657, and an ink 59 was prepared in accordance with the formulation in Example 1.

The synthesized urethane resin had an acid value of 70 mg KOH/g, a terminal acid group proportion of 60% and a urethane bond proportion of 90.0%. The formulation of the ink 59 was as shown below, and the dynamic surface tension $\gamma_{10}$ was 60 mN/m.

Pigment (oxidation-treated carbon black, solid content): 3.50%
Urethane resin (polyurethane 1, solid content): 1.75%
Glycerol: 7.0%
Ethylene glycol: 3.0%
2-Pyrrolidone: 3.40%
Triethylene glycol monobutyl ether: 5.25%
Potassium hydroxide (purity 50%): 0.25%
Pure water: 75.85%

(Ink 60)

A PU-23 was synthesized in accordance with the description in the synthetic method of PU-23 in Japanese Patent Application Laid-Open No. 2012-214712, and an ink 60 was prepared in accordance with the formulation of Example 27. The synthesized urethane resin had an acid value of 60 mg KOH/g, a terminal acid group proportion of 10% and a urethane bond proportion of 95.0%. The formulation of the ink 60 was as shown below, and the dynamic surface tension $\gamma_{710}$ was 50 mN/m.

Carbon black: 3.0%
Resin dispersant (styrene-acrylic resin, solid content): 6.0%
Urethane resin (PU-23, solid content): 3.0%
Glycerol: 9.0%
Diethylene glycol: 5.0%
Triethylene glycol: 5.0%
Acetylenol E100: 0.1%
Pure water: 68.9%

<Evaluation>

The prepared inks were used to perform the following evaluations. In the present invention, "AA", "A" and "B" were regarded as an acceptable level, and "C" was regarded as an unacceptable level based on the following criteria of each evaluation item. The evaluation results are shown in Table 6.

(Character Quality)

An ink cartridge having the structure shown in FIG. 2 and filled with one of the prepared inks was installed in an ink jet recording apparatus having the structure shown in FIG. 1. In the example, the solid image recorded in conditions in which four ink drops each having a mass of 5.8 ng±10% are applied to a unit area of 1/600 inch×1/600 inch is defined as a recording duty of 100%. On a plain paper (trade name "Xerox Business", manufactured by Xerox), a line formed with a width of ten ink drop dots was recorded. The recording conditions were a temperature of 25° C. and a relative humidity of 10%. One day after the recording, an image evaluation apparatus (trade name "Personal IAS", manufactured by QEA) was used to determine the raggedness value of the line, and the character quality was evaluated on the basis of the following criteria. A smaller raggedness value indicates a less blurring of an ink and thus means excellent character quality.

A: The raggedness value was less than 5.0.
B: The raggedness value was 5.0 or more to less than 8.0.
C: The raggedness value was 8.0 or more.

(Highlighter Resistance)

An ink cartridge having the structure shown in FIG. 2 and filled with one of the prepared inks was installed in an ink jet recording apparatus having the structure shown in FIG. 1. In the example, the solid image recorded in conditions in which four ink drops each having a mass of 5.8 ng±10% are applied to a unit area of 1/600 inch×1/600 inch is defined as a recording duty of 100%. On a plain paper (trade name "Bright White Inkjet Paper", manufactured by Hewlett-Packard), a solid image having a size of 1 inch×1 inch and a recording duty of 50% was recorded. Thirty seconds after the recording, the solid image on the recorded product was marked with a yellow line highlighter (trade name "OPTEX2", manufactured by Zebra), and the marker resistance was evaluated on the basis of the following criteria.

AA: The pen tip was not contaminated, and no stain was caused after marking.
A: The pen tip was slightly contaminated, but no stain was caused after marking.
B: The pen tip was contaminated, but stain was not marked after marking.
C: The pen tip was markedly contaminated, and stain was marked after marking.

(Ejection Accuracy)

An ink cartridge having the structure shown in FIG. 2 and filled with one of the prepared inks was installed in an ink jet recording apparatus having the structure shown in FIG. 1. In the example, the solid image recorded in conditions in which four ink drops each having a mass of 5.8 ng±10% was applied to a unit area of 1/600 inch×1/600 inch is defined as a recording duty of 100%. On plain papers with an A4 size (trade name "GF-500", manufactured by Canon), 10 solid images each having a size of 1 inch×1 inch and a recording duty of 50% were recorded, and then a nozzle check pattern was recorded. Next, 20,000 solid images were recorded in similar conditions, and then a nozzle check pattern was recorded once again. The recording conditions were a temperature of 15° C. and a relative humidity of 10%. The nozzle check pattern after recording of 10 solid images was compared with the nozzle check pattern after recording of 20,000 solid images, and the ejection accuracy was evaluated on the basis of the following criteria. Various conditions for the evaluation are shown below.

AA: The nozzle check patterns were normally recorded after recording of 10 solid images and after recording of 20,000 solid images.
A: The nozzle check pattern after recording of 10 solid images was normally recorded. The nozzle check pattern after recording of 20,000 solid images had a little disturbance.
B: The nozzle check patterns after recording of 10 solid images and after recording of 20,000 solid images had a little disturbance.
C: The nozzle check patterns after recording of 10 solid images and after recording of 20,000 solid images had a marked disturbance.

[Various Conditions]

Intrusion amount of wiper*: 1.1±0.5 mm
(*: the height from the position of the ejection orifice face to the leading end of the wiper)
Wiping speed: 80 mm/sec
Wiping timing: after every recording of two A4-size papers
Water-repellent face: a water-repellent face prepared by water-repellent treatment of an ejection orifice face with the water-repellent face (1) or (2)
Water-repellent face (1): a resin prepared by curing a condensation product of a hydrolyzable silane compound having a fluoroalkyl group (a compound having a fluoromethyl group and a methoxy group) and a hydrolyzable silane compound having a cationically polymerizable group (a compound having an epoxy group and an ethoxy group)

Water-repellent face (2): a hydrolyzable silane compound having a fluoroalkyl group (a compound having a fluoromethyl group and a methoxy group)

TABLE 6

Evaluation conditions, evaluation results

| | | | Evaluation conditions | | Evaluation results | |
|---|---|---|---|---|---|---|
| | | Ink | Water repellent treatment | Character quality | Highlighter resistance | Ejection accuracy |
| Example | 1 | 1 | (1) | A | AA | AA |
| | 2 | 2 | (1) | A | AA | AA |
| | 3 | 3 | (1) | A | AA | AA |
| | 4 | 4 | (1) | A | AA | AA |
| | 5 | 5 | (1) | A | AA | AA |
| | 6 | 6 | (1) | A | AA | AA |
| | 7 | 7 | (1) | A | AA | AA |
| | 8 | 8 | (1) | A | AA | AA |
| | 9 | 9 | (1) | A | AA | AA |
| | 10 | 10 | (1) | A | AA | AA |
| | 11 | 11 | (1) | A | AA | AA |
| | 12 | 12 | (1) | A | AA | AA |
| | 13 | 13 | (1) | A | AA | AA |
| | 14 | 14 | (1) | A | AA | AA |
| | 15 | 15 | (1) | A | AA | AA |
| | 16 | 16 | (1) | A | AA | AA |
| | 17 | 17 | (1) | A | AA | AA |
| | 18 | 18 | (1) | A | AA | A |
| | 19 | 19 | (1) | A | B | AA |
| | 20 | 20 | (1) | A | B | AA |
| | 21 | 21 | (1) | A | AA | AA |
| | 22 | 22 | (1) | A | A | AA |
| | 23 | 23 | (1) | A | A | AA |
| | 24 | 24 | (1) | A | A | AA |
| | 25 | 25 | (1) | B | A | AA |
| | 26 | 26 | (1) | B | A | AA |
| | 27 | 27 | (1) | A | AA | A |
| | 28 | 28 | (1) | A | AA | A |
| | 29 | 29 | (1) | A | AA | AA |
| | 30 | 30 | (1) | A | AA | AA |
| Example | 31 | 31 | (1) | A | AA | AA |
| | 32 | 32 | (1) | A | AA | AA |
| | 33 | 38 | (1) | A | AA | AA |
| | 34 | 33 | (1) | A | AA | AA |
| | 35 | 34 | (1) | A | AA | AA |
| | 36 | 35 | (1) | A | AA | AA |
| | 37 | 39 | (1) | A | AA | AA |
| | 38 | 36 | (1) | A | AA | AA |
| | 39 | 37 | (1) | A | AA | AA |
| | 40 | 40 | (1) | A | AA | AA |
| | 41 | 41 | (1) | A | AA | AA |
| | 42 | 42 | (1) | A | AA | A |
| | 43 | 43 | (1) | A | AA | B |
| | 44 | 44 | (1) | A | AA | B |
| | 45 | 1 | (2) | A | AA | A |
| Comparative Example | 1 | 45 | (1) | A | C | AA |
| | 2 | 46 | (1) | A | C | AA |
| | 3 | 47 | (1) | A | C | AA |
| | 4 | 48 | (1) | A | C | AA |
| | 5 | 49 | (1) | A | C | AA |
| | 6 | 50 | (1) | A | C | AA |
| | 7 | 51 | (1) | A | C | AA |
| | 8 | 52 | (1) | C | AA | AA |
| | 9 | 53 | (1) | C | AA | AA |
| | 10 | 54 | (1) | C | AA | AA |
| | 11 | 55 | (1) | C | AA | AA |
| | 12 | 56 | (1) | C | AA | AA |
| | 13 | 57 | (1) | C | AA | AA |
| | 14 | 58 | (1) | C | B | A |
| | 15 | 59 | (1) | AA | C | AA |
| Reference Example | 1 | 60 | (1) | C | AA | AA |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045708, filed Mar. 10, 2017, which is hereby incorporated by reference herein in its entirety.

What is claimed is:

1. An aqueous ink for ink jet, the aqueous ink comprising:
   a pigment; and
   a urethane resin,
   wherein the urethane resin has a unit derived from a polyisocyanate, a unit derived from a polyol having no acid group, and a unit derived from a polyol having an acid group, and a proportion of a unit derived from the polyol having an acid group present at a molecular terminal relative to the whole unit derived from the polyol having an acid group is 30% or less, and
   wherein the aqueous ink has a dynamic surface tension of 55 mN/m or more at a lifetime of 10 msec.

2. The aqueous ink according to claim 1, wherein the polyol having no acid group is a polyether polyol.

3. The aqueous ink according to claim 1, wherein the polyol having an acid group is at least one of dimethylolpropionic acid and dimethylolbutanoic acid.

4. The aqueous ink according to claim 1, wherein the polyisocyanate is isophorone diisocyanate.

5. The aqueous ink according to claim 1, wherein the polyol having no acid group is a polypropylene glycol.

6. The aqueous ink according to claim 1, wherein a proportion of a urethane bond relative to a total amount of a urethane bond and a urea bond in the urethane resin is 85.0% by mole or more.

7. The aqueous ink according to claim 1, further comprising a polyoxyethylene alkyl ether having an HLB value of 13.0 or more, as determined by Griffin's method.

8. The aqueous ink according to claim 1,
   wherein the ink is ejected from a recording head having a water-repellent surface subjected to a water-repellent treatment as an ejection orifice face provided with an ejection orifice, and
   wherein the water-repellent surface is formed of a condensation product of a hydrolyzable silane compound having a fluoroalkyl group and a hydrolyzable silane compound having a cationically polymerizable group.

9. An ink cartridge comprising:
   an ink; and
   an ink storage portion storing the ink,
   wherein the ink comprises the aqueous ink according to claim 1.

10. An ink jet recording method comprising:
    ejecting an ink from an ink jet recording head to record an image on a recording medium,
    wherein the ink comprises the aqueous ink according to claim 1.

* * * * *